(12) United States Patent
Kim

(10) Patent No.: US 7,680,483 B2
(45) Date of Patent: Mar. 16, 2010

(54) MOBILE CONTENT ACCESS AND TRANSMISSION METHOD USING HYPERLINK MESSAGE, AND MOBILE TERMINAL, MOBILE COMMUNICATION PROVIDER SERVER AND CONTENT PROVIDER SERVER FOR THE SAME

(76) Inventor: Nag-Ku Kim, 487-398, Yeonnam-dong, Mapo-gu, Seoul (KR) 121-868

( * ) Notice: Subject to any disclaimer, the term of this patent is extended or adjusted under 35 U.S.C. 154(b) by 561 days.

(21) Appl. No.: 11/570,121

(22) PCT Filed: May 18, 2006

(86) PCT No.: PCT/KR2006/001854

§ 371 (c)(1),
(2), (4) Date: Dec. 6, 2006

(87) PCT Pub. No.: WO2006/129923

PCT Pub. Date: Dec. 7, 2006

(65) Prior Publication Data

US 2008/0287098 A1    Nov. 20, 2008

(30) Foreign Application Priority Data

May 30, 2005   (KR)  .................... 10-2005-0045337
Jun. 27, 2005   (KR)  .................... 10-2005-0055442
Nov. 24, 2005  (KR)  .................... 10-2005-0112983

(51) Int. Cl.
*H04M 11/00* (2006.01)
(52) U.S. Cl. .................. 455/406; 455/407; 455/408; 379/114.03; 379/114.13; 379/114.18; 379/114.22; 379/114.23
(58) Field of Classification Search ......... 455/403–408; 379/114.3, 114.13, 114.18, 114.22, 114.23
See application file for complete search history.

(56) References Cited

U.S. PATENT DOCUMENTS

| 2002/0091570 | A1* | 7/2002 | Sakagawa ..................... 705/14 |
| 2002/0178060 | A1* | 11/2002 | Sheehan ...................... 705/14 |
| 2002/0184319 | A1* | 12/2002 | Willner et al. ............... 709/206 |
| 2003/0032409 | A1* | 2/2003 | Hutcheson et al. .......... 455/414 |
| 2003/0061141 | A1* | 3/2003 | D'Alessandro .............. 705/36 |
| 2003/0105659 | A1* | 6/2003 | Eisenstein ................... 705/10 |

FOREIGN PATENT DOCUMENTS

KR    10-2001-0000124    5/2000

(Continued)

*Primary Examiner*—Lun-Yi Lao
*Assistant Examiner*—Dung Hong
(74) *Attorney, Agent, or Firm*—Holme Roberts & Owen LLP

(57) ABSTRACT

Disclosed herein are a mobile contents access, transmission and reception method using a hyperlink message, the method allowing predetermined contents to be displayed or to be activated when a hyperlink of the hyperlink message is selected, the hyperlink message includes hyperlink information designating a connection point at which the contents will be executed on the terminal, and free communication identification information indicating that a communication fee normally charged to the terminal is not charged, the terminal adds an indication of free communication to the hyperlink message and displays them on a display means, the contents are activated in the terminal through the connection between the terminal and the connection point, and when the connection is terminated, the mobile communication provider server calculates the communication fee to be charged for the connection through, and stores it as billing information for the contents provider rather than billing information for the terminal.

13 Claims, 8 Drawing Sheets

FOREIGN PATENT DOCUMENTS

| | | |
|---|---|---|
| KR | 10-2001-0035348 | 5/2001 |
| KR | 10-2005-0025853 | 9/2003 |
| KR | 10-2004-0073334 | 2/2004 |
| KR | 10-2004-0029594 | 4/2004 |
| KR | 10-2004-0044804 | 5/2004 |
| KR | 10-2004-0102273 | 12/2004 |
| WO | WO 03/001755 * | 1/2003 |

* cited by examiner

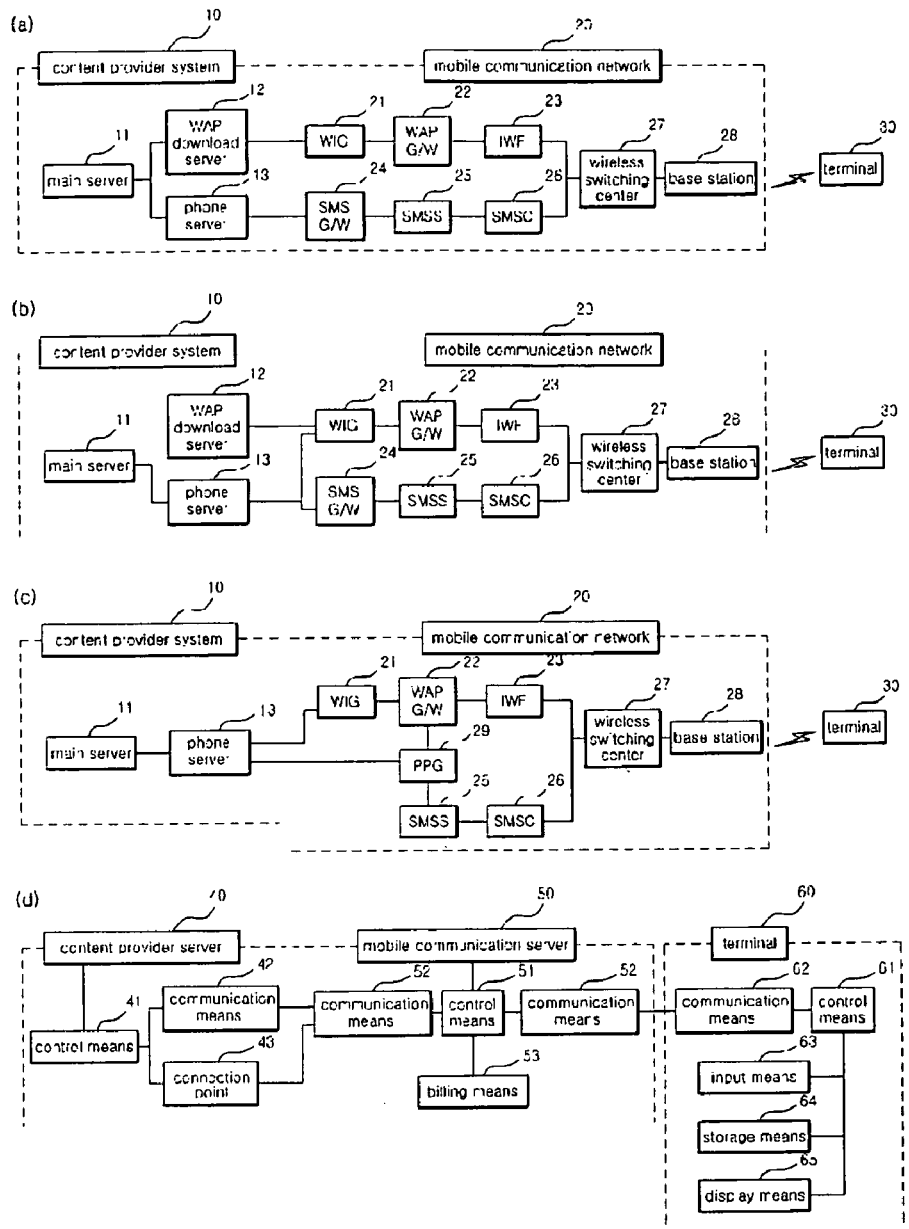

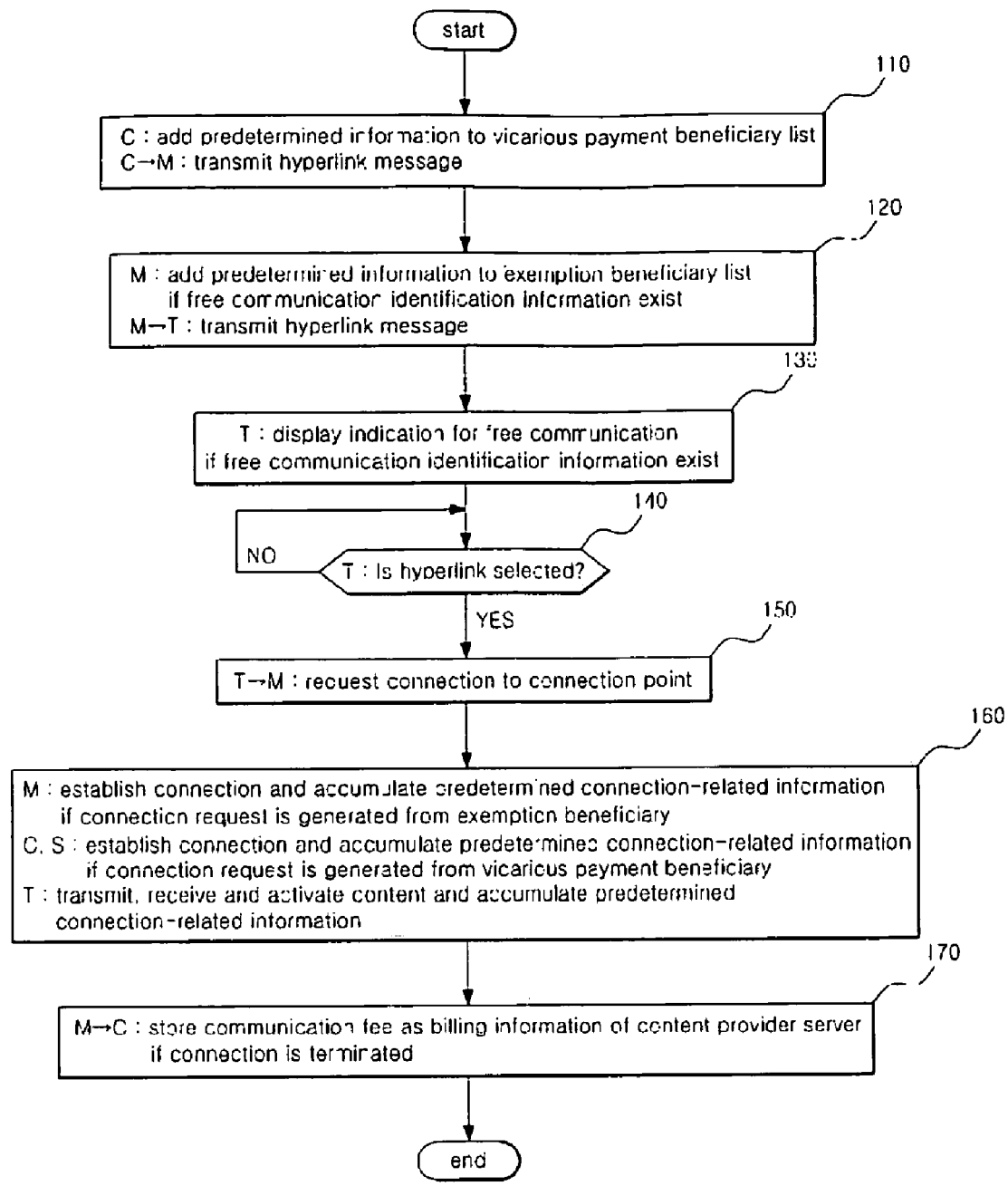

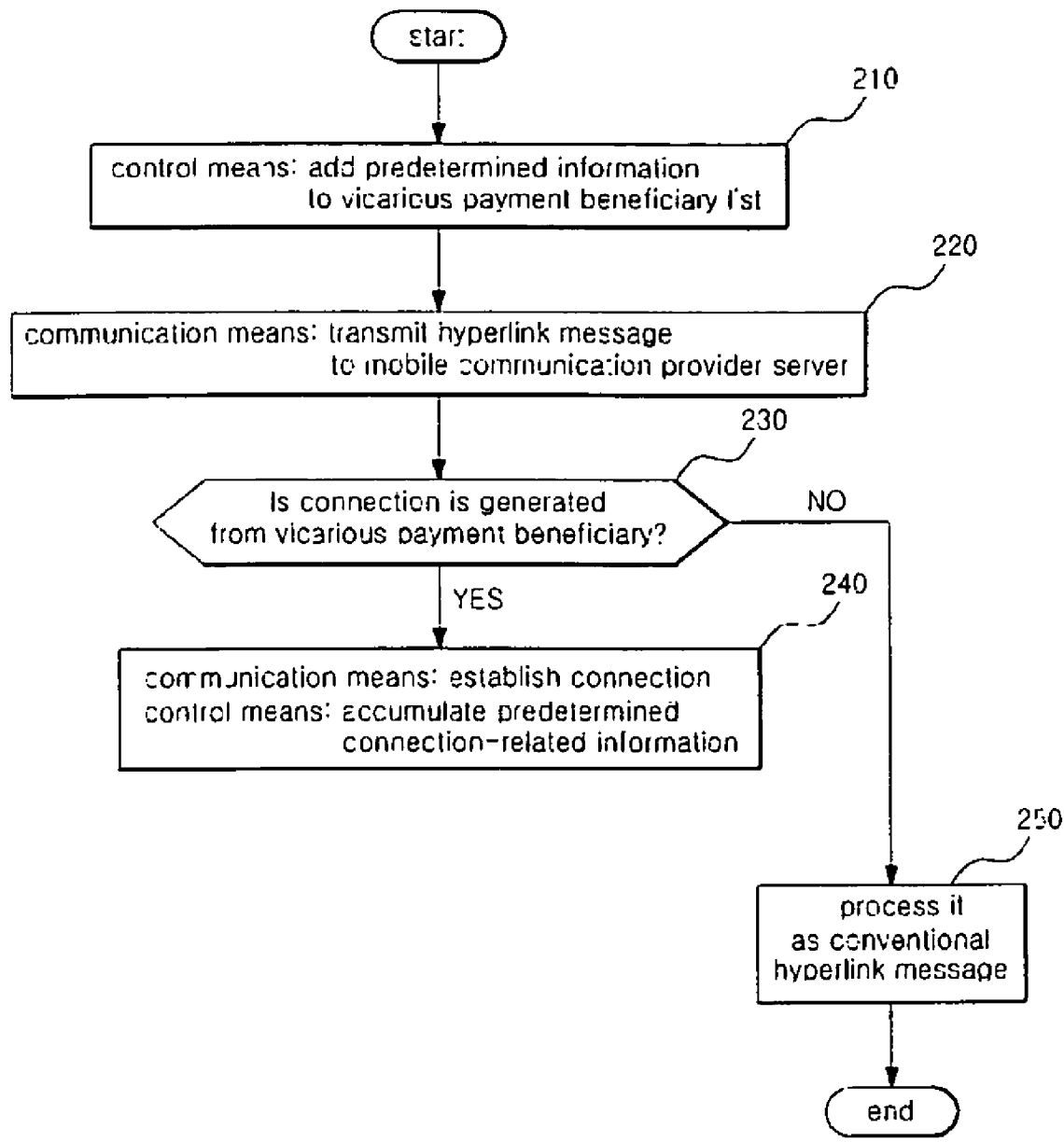
[Fig. 4]

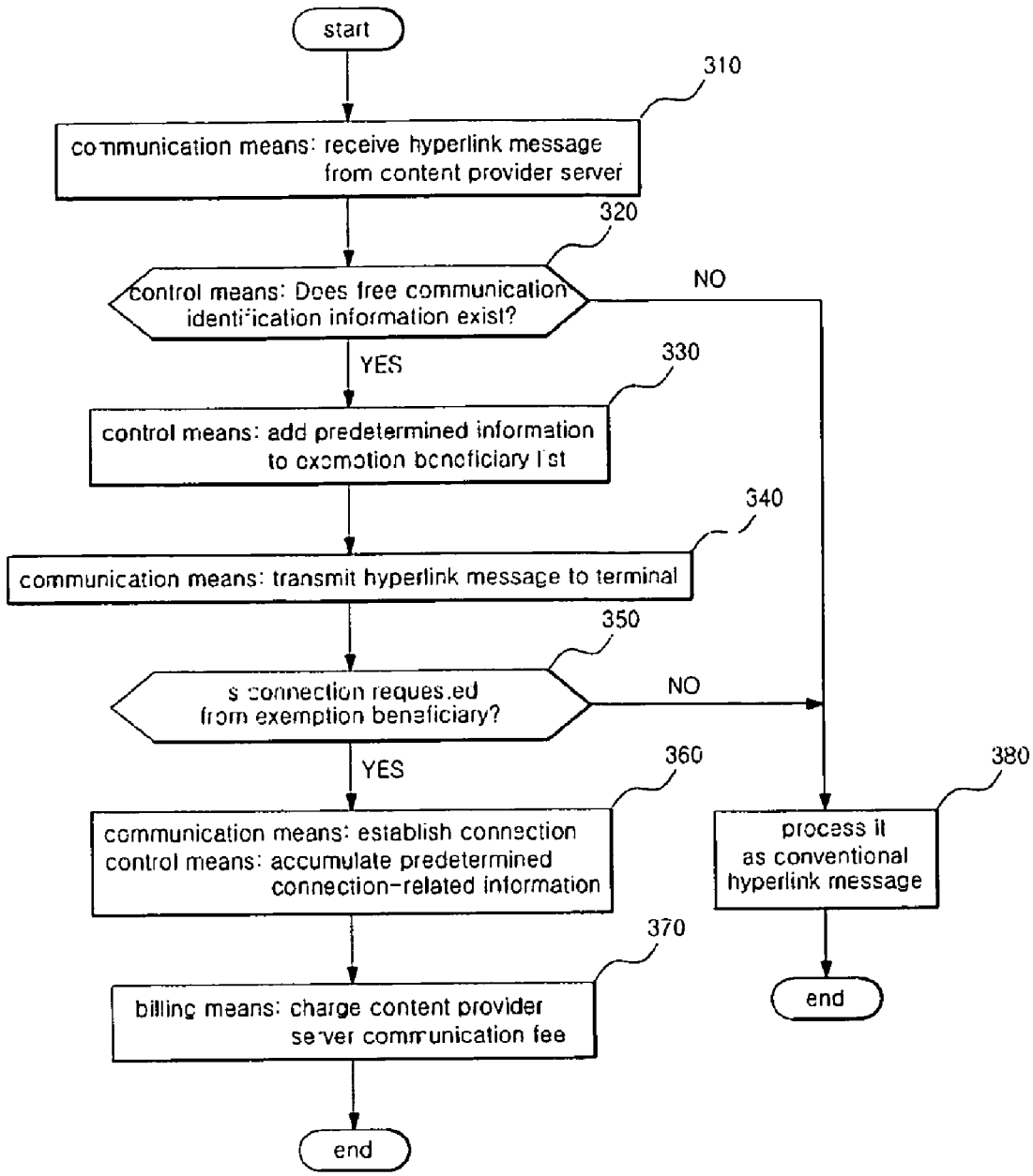
[Fig. 5]

[Fig. 6]
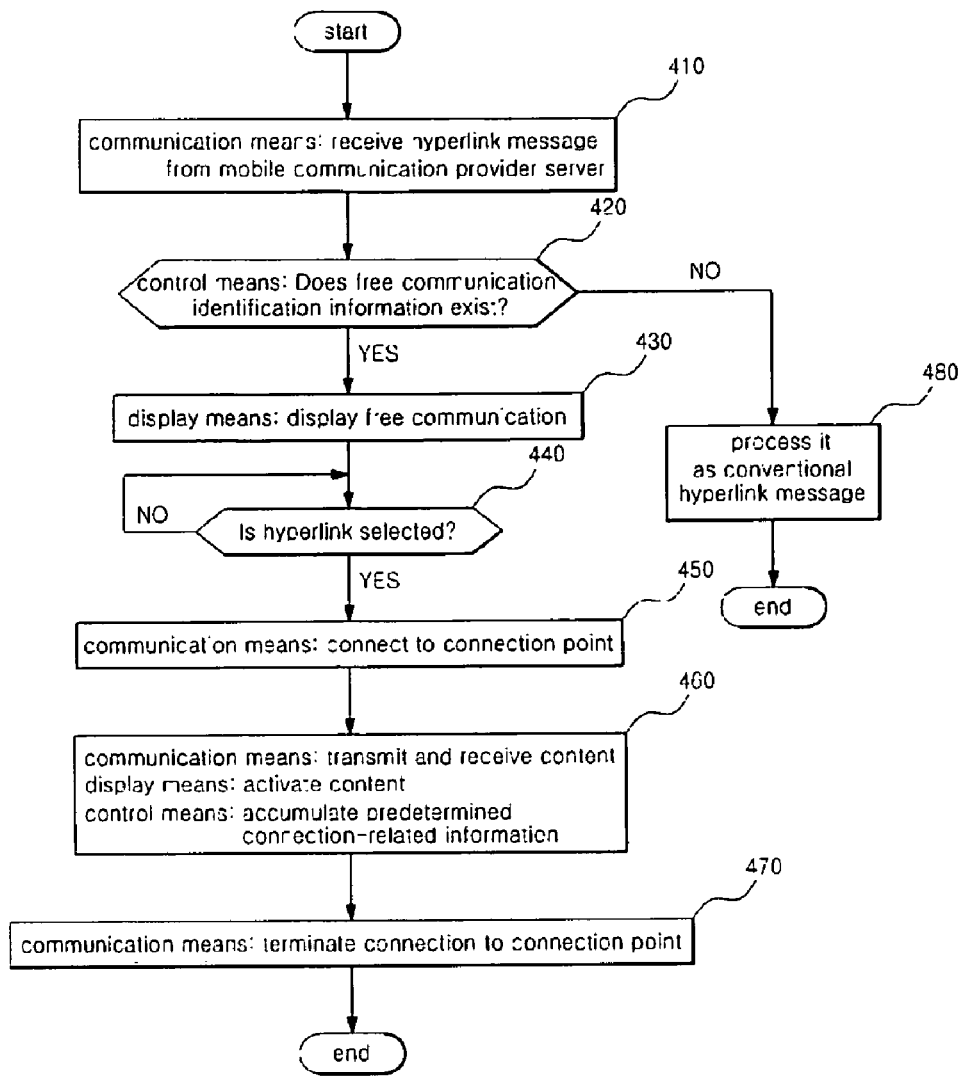
[Fig. 7]
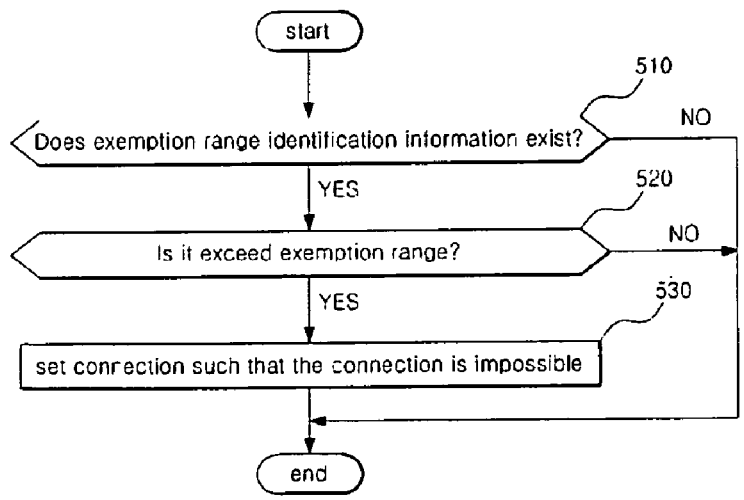

[Fig. 8]
(a) 
(b) 
(c) 
(d)
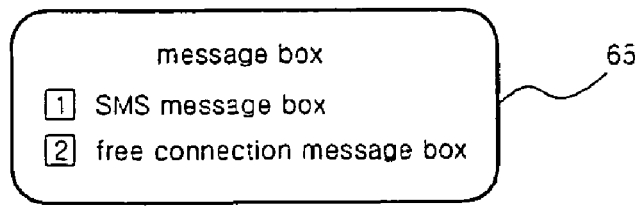
(e)
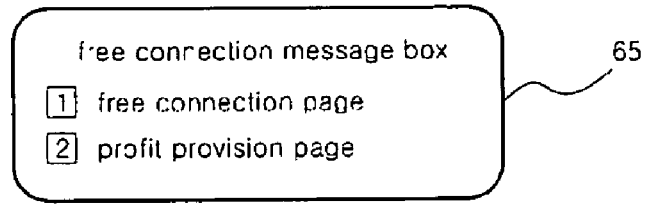
(f)
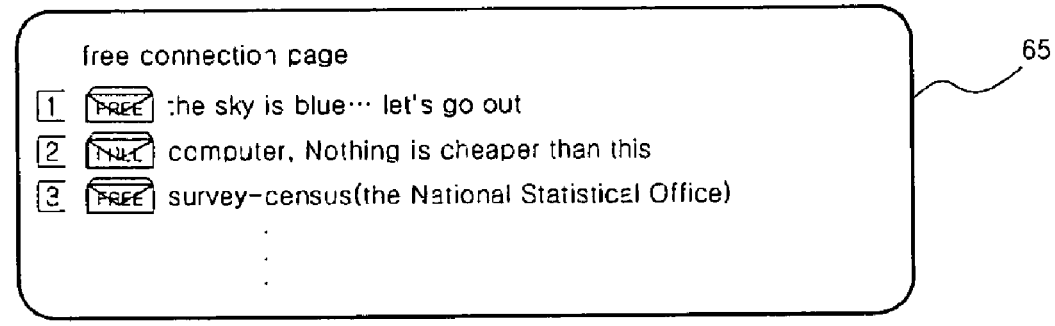
(g)
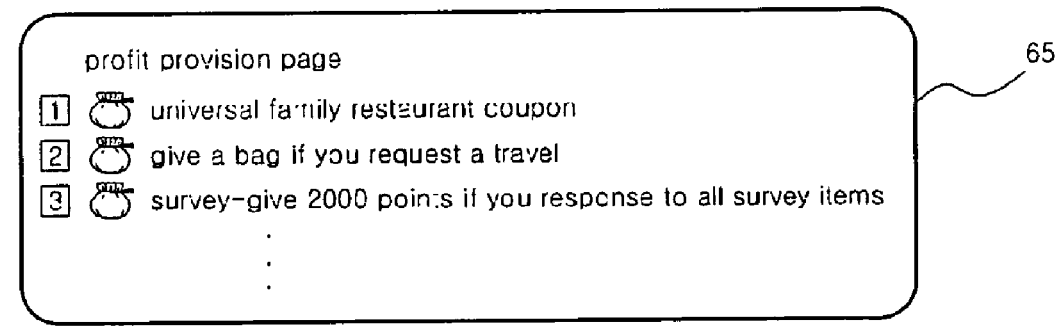

[Fig. 9]
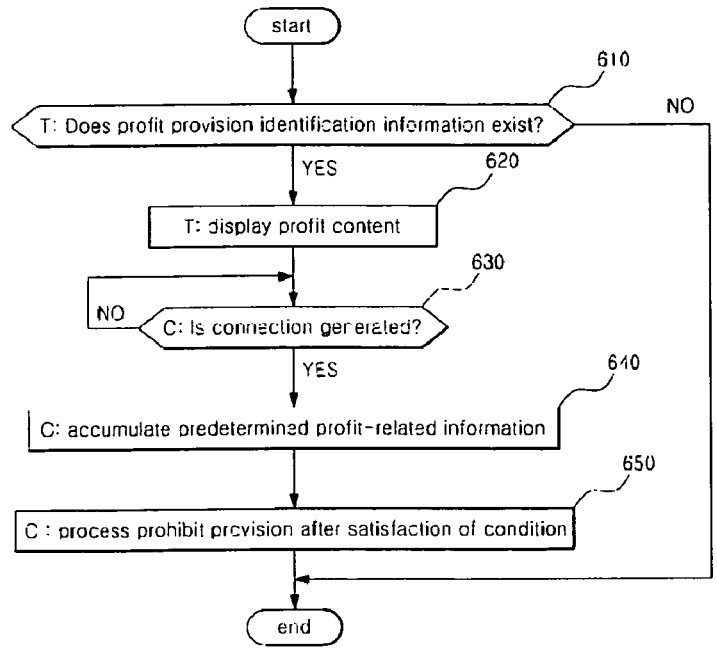
[Fig. 10]
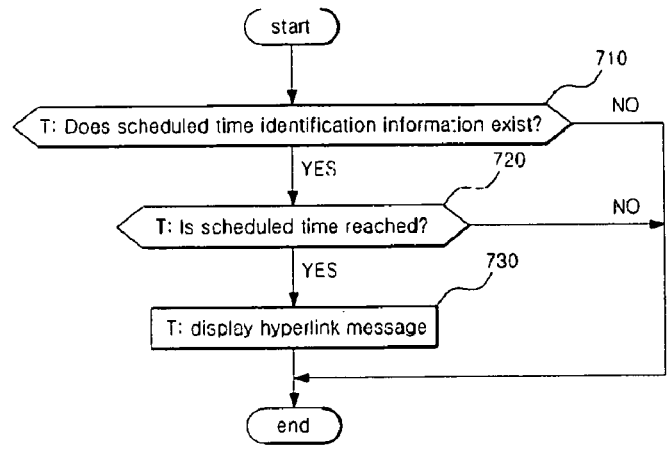
[Fig. 11]
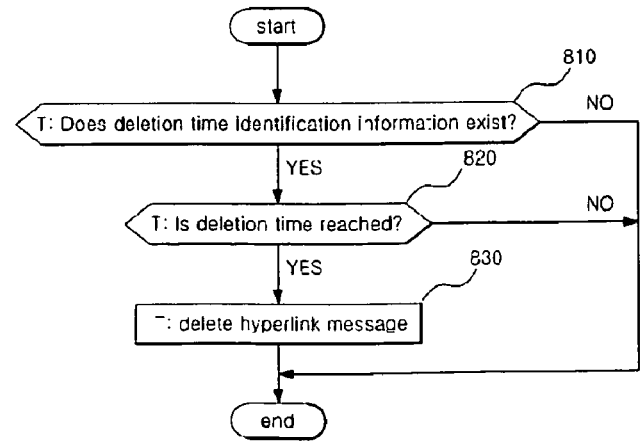

[Fig. 12]

(a) screen

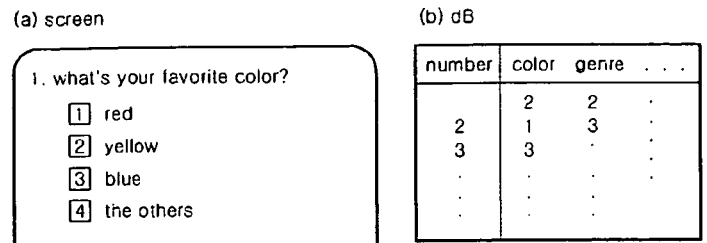

1. what's your favorite color?
   [1] red
   [2] yellow
   [3] blue
   [4] the others 2. what's your favorite music genre?
   [1] POP
   [2] trot
   [3] ballad
   . . .

65

(b) dB

| number | color | genre | . . . |
|---|---|---|---|
|  | 2 | 2 | . |
| 2 | 1 | 3 | . |
| 3 | 3 | . | . |
| . | . | . |  |
| . | . | . |  |

(c)

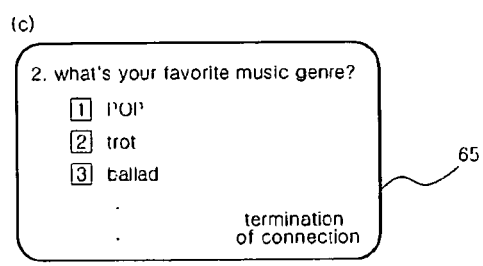

2. what's your favorite music genre?
   [1] POP
   [2] trot
   [3] ballad
   .
   .                    termination
                        of connection

65

(d)

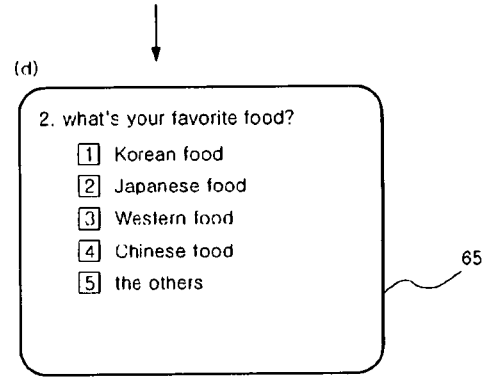

2. what's your favorite food?
   [1] Korean food
   [2] Japanese food
   [3] Western food
   [4] Chinese food
   [5] the others

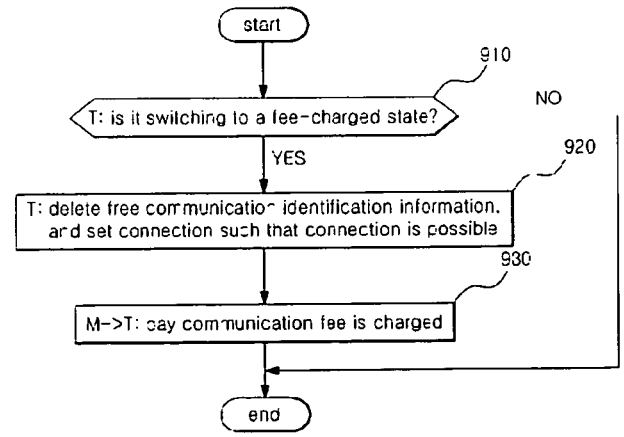

start
↓
910 — T: is it switching to a fee-charged state? — NO →
↓ YES
920 — T: delete free communication identification information, and set connection such that connection is possible
↓
930 — M→T: say communication fee is charged
↓
end

MOBILE CONTENT ACCESS AND TRANSMISSION METHOD USING HYPERLINK MESSAGE, AND MOBILE TERMINAL, MOBILE COMMUNICATION PROVIDER SERVER AND CONTENT PROVIDER SERVER FOR THE SAME

CROSS REFERENCE TO RELATED APPLICATION

This application is a national stage application under 35 U.S.C. 371 of PCT Application No. PCT/KR2006/001854 having an international filing date of May 18, 2006, which designated the United States, which PCT application claimed the benefit of Korean Application Serial No. 10-2005-0045337, filed May 30, 2005; Korean Application Serial No. 10-2005-0055442, filed Jun. 27, 2005; and Korean Application Serial No. 10-2005-0112983, filed Nov. 24, 2005, the entire disclosure of which are hereby incorporated herein by reference.

TECHNICAL FIELD

The present invention relates, in general, to a mobile contents access, transmission and reception method using a hyperlink message, and a mobile terminal, a mobile communication provider server and a contents provider server for the same and, more particularly, to a method that accesses mobile contents using a hyperlink message (a free callback message) including a callback URL, which exempts a mobile terminal from a communication fee for data transmission and reception, and that transmits and receives data, a mobile communication terminal in which such a function is implemented, and a mobile communication provider and a contents provider server which enable the function. That is, the present invention relates to a method of exempting a terminal from a mobile communication fee, which is necessarily charged at the time of provision of mobile contents to the mobile terminal, or of minimizing the fee.

BACKGROUND ART

In general, when the user of a mobile communication terminal or a portable phone utilizes wireless Internet contents, fees for the usage are mainly classified into two types. The one is a contents usage fee and the other is a data communication fee. The former is the fee paid to a contents provider, and the latter is the fee paid to a mobile communication provider.

In this case, the contents usage fee is very clearly indicated. That is, it is clearly indicated that a specific fee will be charged or the contents usage fee is fire. However, the data communication fee depends on the situation. That is, the fee may differ considerably depending on the size of contents file. As a result, a user who perceived a small contents usage fee and then utilized contents without hesitation is charged a fee for a large amount of data communication because of the large size of the contents, which frequently gives rise to complaints. Recently, this is the biggest problem of which a user complains.

As described above, the term "free mobile contents" means that there is no contents usage fee, rather than that a communication fee required for data download or upload after access to the contents is not charged. Due to concern about the communication fee, the user of a terminal is somewhat reluctant to access mobile contents in practice. Conventionally, when a terminal utilizes mobile contents, data is transmitted and received on a packet basis, and, thereafter, the terminal is charged for this. That is, the terminal pays a related fee to a mobile communication provider based on the access and the total size of transmitted and received packets.

A mobile contents user is unwilling to use mobile contents because it is very difficult to estimate the data communication fee, which has been a big obstacle preventing the activation of the mobile Internet market. In order to provide contents related to mobile discount coupons, mobile advertisements, or mobile surveys, which will be provided to mobile terminals by contents providers at no charge in the future, it is important to exempt the terminal from a net communication fee to be paid.

Meanwhile, in the field of advertisement, marketing, or questionnaire survey (research) and the like, it is necessary to effectively deliver a large amount of information, thereby obtaining good responses with high efficiency. As a tool used to obtain such an effect, many tools have been proposed.

A conventional Short Message Service (SMS) is easily used by people at a low cost or at no charge, but short messages used in SMS deliver only text, thereby having disadvantages in that the contents thereof is simple and short. Therefore, it is difficult to expect high efficiency in the delivery of information.

Furthermore, a conventional contents push method is a method in which a contents provider transmits contents to a terminal in a push manner. The method previously transmits a predetermined large amount of contents, so that the contents is abundant, and a communication fee is low considering the amount of data if communication is performed within a discount rate time zone. However, there are disadvantages in that large memory is required, an excessive communication fee is charged when there are many recipients, and it is difficult to compare and correct the stored contents with the current contents, thereby resulting in the up-to-date contents not being used if there is a difference between contents downloaded and stored in the terminal and contents currently possessed by a contents provider.

Furthermore, of conventional arts, there is a technology in which a connection point, that is, a Uniform Resource Locator (URL), is directly input into a terminal, and then contents is downloaded. This is performed as if a connection to the Internet were directly made and contents were used in a computer environment. Since the contents of a connection point is activated in a terminal, this technology has advantages in that the contents thereof is abundant, long and up-to-date, but there are problems in that a procedure of inputting the address of a connection point by a mobile terminal is complicated and inconvenient, and in that a communication fee is charged for the transmission and reception of the contents, so that terminal users are unwilling to utilize this.

Furthermore, among conventional arts, there is a technology in which, when a contents provider provides a certain contents to a terminal, a short message (Callback URL SMS) in which a hyperlink is included is first transmitted to the terminal, and, thereafter, the terminal connects to the contents through the hyperlink and downloads it. This is called 'Call-Back Service' and the message is called a 'pay callback message'.

The callback message has advantages in that the contents of a connection point designated by the hyperlink is activated in the terminal, so that the contents is always abundant, long and up-to-date, and it is not necessary to directly input the connection point, thereby being convenient to use.

However, since the communication fees are charged for the transmission and reception of the contents, there is a problem in that the terminal owners are unwilling to utilize it.

Furthermore, in order for the contents provider to transmit a message including a hyperlink, the permission of the mobile terminal must be occasionally obtained through a mobile communication provider. The reason for this is to guard against spam messages indiscriminately transmitted to the terminal but, most of all, to obtain consent in advance because the terminal must pay a net communication fee along with a contents usage fee when the terminal connects to a corresponding URL address through such a pay callback message.

Currently, the biggest problem with free advertisements or a survey business on mobile terminals is related to the entity which handles the communication fees of a terminal. If a method of resolving the communication fee of the terminal is not provided, the mobile communication provider cannot permit the contents provider to freely transmit a callback message including hyperlink, or a short message which is only composed of text or a message comprising multimedia. This has the potential to become a big obstacle in the business development of contents providers, thereby hampering industrial development.

DISCLOSURE OF INVENTION

Technical Problem

Accordingly, the present invention has been made keeping in mind the above problems occurring in the prior art, and an object of the present invention is to provide a mobile contents access and transmission and reception method which enables connection without payment, as free conventional SMS, by performing transfer of responsibility for payment in which the communication fee for contents transmission and reception is charged to a contents provider server rather than to a terminal when a message (free callback message) including a predetermined free callback hyperlink, which is set between a mobile terminal manufacturer, a mobile communication provider and a contents provider, is utilized.

Furthermore, the present invention is intended to provide a mobile contents access and transmission and reception method in which the transfer of responsibility for payment is restrictively performed only within a predetermined range previously set by the contents provider server.

For example, a contents provider server for transmitting a free mobile coupon to a terminal based on profits from an advertiser can attract the terminal to actively use the advertisement coupon contents while being exempted from a communication fee through the present invention, resolving the burden of communication fee of the terminal, and, at the same time, limits a total communication fee generated by the terminal's connecting to contents and doing contents transmission and reception, such as download and upload, to a predetermined level. If there is no limitation on the communication fee, a terminal may repeatedly use a contents, and in this case, a net-communication fee to be paid by the contents provider may exceed the level previously set by the contents provider. Therefore, the limitation ensures that communication is performed within an appropriately required range not requiring payment, thereby leading to usage by a terminal, the enhancement of advertising impact for an advertiser, the increase of profit for a contents provider, and the security of communication fees for a mobile communication provider, and thus resulting in development of mobile internet related business.

That is, the present invention provides a concrete technology with which the terminal is exempted from paying a communication fee within a predetermined range for a predetermined total size of packets, the number of connections and a connection validity period and, at the same time, the contents provider vicariously pays the communication fee to the mobile communication provider within the predetermined range at the time of connecting to and using specific contents.

Furthermore, the present invention provides a mobile contents access, transmission and reception method which not only exempts the terminal from paying the communication fee but also provides predetermined profits to the terminal depending on the usage of contents.

For this purpose, the present invention provides a mobile contents access, transmission and reception method in which whether a hyperlink message is a message that allows exemption from the communication fee and/or a message providing profits can be clearly checked through a predetermined indication displayed on the display means of a terminal.

Meanwhile, the present invention provides a mobile contents access, transmission and reception method in which the contents provider server can control the time at which the hyperlink message is displayed and the time at which the hyperlink message is deleted.

Meanwhile, the present invention provides a mobile contents access, transmission and reception method in which, in the case of contents responding to a plurality of inquiry items, such as research, performs counting immediately after responding, and enables successive response through re-connection even when a connection is cut off while responding.

The present invention provides a mobile contents access, transmission and reception method in which a terminal switches to a pay state and maintains the connection even if exceeding a predetermined exemption range.

Furthermore, the present invention provides a mobile communication terminal, a mobile communication provider server and a contents provider server suitable for use in the mobile contents access, transmission and reception method using a hyperlink message.

Technical Solution

In order to accomplish the above objects, the present invention provides a mobile contents access, transmission and reception method using a hyperlink message, and a mobile terminal, a mobile communication provider server and a contents provider server for the same.

According to one aspect of the present invention, there is provided the mobile contents access, transmission and reception method using a hyperlink message, using a contents provider server having at least communication means and control means a mobile communication provider server having at least communication means, billing means and control means, and a terminal having at least communication means, display means, input means, storage means and control means, the method allowing predetermined contents to be displayed or to be activated when a hyperlink of the hyperlink message transmitted from the contents provider server through the mobile communication provider server to the terminal, stored in the terminal and displayed on the terminal is selected, wherein the hyperlink message is configured to include at least hyperlink information designating a connection point of contents will be activated on the terminal, and free communication identification information indicating that a communication fee normally charged to the terminal by the mobile communication provider server for contents access is not charged, and the terminal displays the hyperlink message with a predetermined indication of free communication on the display means if it is determined that the free communication identification information is included in the hyperlink message, a connection to the connection point is requested from the terminal to the mobile communication provider server by selecting the hyperlink of the hyperlink message, and the mobile communication provider server causes the connection to be established in response to the connection request, the contents is activated in the terminal through the connection between the terminal and the connection point, and when the connection is terminated, the mobile communication provider server calculates the communication fee to be charged for the connection for data transmission and reception through the billing means, and stores it as billing information for the contents provider rather than billing information for the terminal.

Preferably, the hyperlink message may further include exemption range identification information representing an exemption range which is a limited range of exemption from the data communication fee to be charged to the terminal by the mobile communication provider server for the connection to the contents. At this time, the control means of the terminal accumulates parameters related to the exemption range set in the exemption range identification information during transmission and reception of the contents, and sets the connection between the terminal and the connection point in such manner that it is allowed only when the accumulated parameters fall within the exemption range, or the control means of the mobile communication provider server accumulates a parameters related to the exemption range set in the exemption range identification information during transmission and reception of the contents, and sets the connection between the terminal and the connection point in such manner that it is allowed only when the accumulated parameters falls within the exemption range, or at least one of the control means of the contents provider server and the control means of the connection point accumulates parameters related to the exemption range set in the exemption range identification information during the transmission and reception of the contents, and sets the connection between the terminal and the connection point in such manner that it is allowed only when the accumulated the parameters falls within the exemption range.

The exemption range identification information is (1) with respect to the terminal, at least one of a total packet size, a connection validity period, a number of connections, and a top folder of the connection point, (2) with respect to the connection point, at least one of a total packet size, a connection validity period, a number of connections, and a top folder of the connection point; or (3) with respect to the hyperlink message, at least one of a total packet size, a connection validity period, a number of connections, and a top folder of the connection point.

Preferably, the indication of free communication may be a dedicated icon, a dedicated melody, a dedicated voice announcement, a dedicated pattern of lamp illumination or flickering, a dedicated pattern of vibration, or a combination thereof. The hyperlink message may be assigned to a dedicated message box and is displayed on the display means.

Furthermore, the hyperlink message further comprises profit provision identification information indicating that a predetermined profit is provided to the terminal when a predetermined condition is satisfied by the connection to the contents. The control means of the terminal adds a predetermined indication of profit provision to the hyperlink message and then displays them on the display means if it is determined that the profit provision identification information is included in the hyperlink message. At least one of the control means of the contents provider server and the control means of the connection point may accumulate parameters related to the predetermined condition set in the profit provision identification information during transmission and reception of contents and activation of the contents, and perform a process of profit provision if it is determined that the accumulated parameters satisfy the predetermined condition. In this case, the profit may be at least one of a tangible or intangible present, a fortune gift, a coupon, member's points and cyber money. Furthermore, the indication of profit provision is preferably a dedicated icon, a dedicated melody, a dedicated voice announcement, a dedicated pattern of lamp illumination or flickering, a dedicated pattern of vibration, or a combination thereof. The hyperlink message may be assigned to a dedicated message box and is displayed on the display means.

Furthermore, the hyperlink message further includes scheduled time identification information designating a time at which the hyperlink message is to be displayed on the display means. The control means of the terminal may display the hyperliik message on the display means after the scheduled time has been reached if it is determined that the scheduled time identification information is included in the hyperlink message. The hyperlink message further includes deletion time identification information designating a time at which the hyperlink message is to be deleted from the storage means. The control means of the terminal may delete the hyperlink message from the storage means after the deletion time has been reached if it is determined that deletion time identification information is included in the hyperlink message.

Preferably, a condition for selecting target terminals to which the hyperlink message is to be delivered is determined by the contents provider server and is transmitted to the mobile communication provider server.

Preferably, the contents is contents that is to be made responses to one or more predetermined inquiry items, and the response is stored in a field of a database on an Internet corresponding to the item when a response to each of the items is made. In this case, when the connection is disconnected before complete responses to all of the items and thereafter the connection is reconnected, it is preferable that activation starts from an item next to an item to which responses have been made.

Preferably, at least one of the control means of the contents provider server and the control means of the connection point adds predetermined information about target terminals, which are to be exempted from the communication fee for data transmission and reception by the contents provider server, to a vicarious payment beneficiary list, transmits the vicarious payment beneficiary list to the mobile communication provider server along with the hyperlink message, and performs setting about whether the terminal can be connected to the connection point after determination of whether the terminal requesting the connection is a terminal on the vicarious payment beneficiary list. Alternatively, it is preferred that the control means of the mobile communication provider server receives the vicarious payment beneficiary list storing the pre-determined information about terminals, which are to be exempted from a communication fee for data transmission and reception by the contents provider server, from the contents provider server, add predetermined information of the vicarious payment beneficiary list to an exemption beneficiary list, and perform setting about whether the terminal can be connected to the connection point after determination of whether the terminal requesting the connection is a terminal on the vicarious payment beneficiary list.

Furthermore, it is preferred that, in a state in which the accumulated parameters exceed the exemption range, and, therefore, the connection between the terminal and the connection point has been set such that the connection is impossible, the control means of the terminal deletes the free communication identification information of the hyperlink message and sets the connection between the terminal and the connection point such that the connection is possible through the communication means.

Preferably, the connection point is controlled by the mobile communication provider server.

According to one aspect of the present invention, there is provided a terminal for mobile contents access, transmission and reception having at least communication means, display means, input means, storage means and control means, the terminal allowing predetermined contents to be displayed or to be activated when a hyperlink of a hyperlink message transmitted from a contents provider server, having at least communication means and control means, through the mobile communication provider server, having at least communication means, billing means and control means, and stored and displayed, is selected, wherein the hyperlink message is configured to include at least hyperlink information designating a connection point of contents which will be activated on the terminal, and free communication identification information indicating that a data communication fee normally to be charged to the terminal by the mobile communication provider server for the contents access is not charged, the communication means of the terminal is configured to connect to the mobile communication provider server, the display means of the terminal is configured to add a predetermined indication for free communication to the hyperlink message and then display it, the storage means of the terminal is configured to store the hyperlink message, and the control means of the terminal is configured to direct the display means to add the predetermined indication for free communication to the hyperlink message and then display it if it is determined that the free communication identification information is included in the hyperlink message, and to activate the contents on the display means while transmitting and receiving contents by the communication means through the mobile communication provider server after connection to the connection point without being charged by the billing means of the mobile communication provider server when a hyperlink of the hyperlink message to which the indication for free communication is added is selected.

In this case, the hyperlink message further includes exemption range identification information representing an exemption range which is a limited range of exemption from the data communication fee charged to the terminal by the mobile communication provider server for the connection to the contents. The control means of the terminal may accumulate parameters related to the exemption range set in the exemption range identification information during transmission and reception of the contents, and set the connection between the terminal and the connection point in such manner that it is allowed only when the accumulated parameters fall within the exemption range. In this, case, the exemption range identification information may be, with respect to the terminal, at least one of a total packet size, a connection validity period, a number of connections, and a top folder of the connection point.

Preferably, the indication of free communication may be a dedicated icon, a dedicated melody, a dedicated voice announcement, a dedicated pattern of lamp illumination or flickering, and a dedicated pattern of vibration or a combination thereof, or the hyperlink message may be assigned to a dedicated message box and is displayed on the display means.

Meanwhile, the hyperlink message may further include profit provision identification information indicating that a predetermined profit is provided to the terminal through at least one of the control means of the contents provider server and the control means of the connection point when a predetermined condition is satisfied through connection to the contents. In this case, the control means of the terminal may add a predetermined indication for profit provision to the hyperlink message and then displays it on the display means when it is determined that the profit provision identification information is included in the hyperlink message. In this case, the indication of profit provision may be a dedicated icon, a dedicated melody, a dedicated voice announcement, a dedicated pattern of lamp illumination or flickering, a dedicated pattern of vibration, or a combination thereof. And the hyperlink message may be assigned to a dedicated message box and is displayed on the display means.

Preferably, the hyperlink message may further include scheduled time identification information designating a time at which the hyperlink message is to be displayed on the display means. And the control means of the terminal may display the hyperlink message after the scheduled time has been reached if it is determined that the scheduled time identification information is included in the hyperlink message. Furthermore, the hyperlink message further includes deletion time identification information designating a time at which the hyperlink message is to be deleted from the storage means. And the control means of the terminal may delete the hyperlink message from the storage means after the deletion time has been reached if it is determined that the deletion time identification information is included in the hyperlink message.

Preferably, in a state in which the accumulated parameters exceeds the exemption range, and, therefore, the connection between the terminal and the connection point has been set in such manner that the connection is impossible, the control means of the terminal may delete the free communication identification information of the hyperlink message and set the connection between the terminal and the connection point in such manner that the connection is possible through the communication means.

According to one aspect of the present invention, there is provided a mobile communication provider server for mobile contents access, transmission and reception having at least communication means, billing means and control means, the mobile communication provider server receiving a hyperlink message from a contents provider server having at least communication means and control means, transmitting it to a terminal having at least communication means, display means, input means, storage means and control means, and allowing a predetermined contents to be displayed or activated on the terminal, if the hyperlink of the hyperlink message which is stored and displayed on the terminal, is selected wherein the hyperlink message is configured to include at least hyperlink information designating a connection point of the contents which will be activated on the terminal, and free communication identification information indicating that a data communication fee normally charged to the terminal by the mobile communication provider server for the contents access is not to be charged, the communication means of the mobile communication provider server is configured to connect to the terminal, the contents provider server and the connection point, to receive a connection request to the connection point through the selection of a hyperlink of the hyperlink message including the free communication identification information, and to establish the connection between the terminal and the connection point, the billing means of the mobile communication provider server is configured to estimate a communication fee for data transmission and reception to be charged for connection for contents usage, and to store it as billing information for the contents provider rather than billing information for the terminal, and the control means of the mobile communication provider server is configured to transmit the hyperlink message from the contents provider server to the terminal by controlling the communication means, to establish the connection between the terminal and the connection point in response to receipt of a connection request from the terminal and to estimate the above-mentioned fee and store billing information by controlling the billing means.

In this case, preferably, the hyperlink message further includes exemption range identification information representing an exemption range which is a limited range of exemption from the data communication fee normally charged to the terminal by the mobile communication provider server for the connection to contents. And the control means of the mobile communication provider server may accumulate parameters related to the exemption range set in the exemption range identification information during transmission and reception of the contents, and the connection between the terminal and set the connection point in such manner that it is allowed only when the accumulated parameters falls within the exemption range. In this case, preferably, the exemption range identification information may be (1) with respect to the terminal, at least one of a total packet size, a connection validity period, a number of connections, and a top folder of the connection point, (2) with respect to the connection point, at least one of a total packet size, a connection validity period, a number of connections, and a top folder of the connection point, or (3) with respect to the hyperlink message, at least one of a total packet size, a connection validity period, a number of connections, and a top folder of the connection point.

Preferably, the mobile communication provider server may receive a condition from the contents provider server for selecting a terminal to which the hyperlink message is to be delivered.

Preferably, the contents may be a contents that is to be made responses to one or more inquiry items, and the response may be stored in the field of a database on the Internet corresponding to the item when a response to each of the items is made. In this case, when the connection is disconnected before complete responses to all of the items and thereafter the connection is reconnected, it is preferable that activation starts from the item next to the item to which responses have been made.

Preferably, the control means of the mobile communication provider server may receive the vicarious payment beneficiary list storing the predetermined information about terminals, which are exempted from a communication fee for data transmission and reception by the contents provider server, from the contents provider server, add the predetermined information in the vicarious payment beneficiary list to an exemption beneficiary list, and perform setting whether the terminal can be connected to the connection point after determination of whether the terminal is a terminal on the vicarious payment beneficiary list.

Preferably, the connection point may be controlled by the mobile communication provider server.

According to one aspect of the present invention, there is provided a contents provider server for mobile contents access, transmission and reception having at least communication means and control means, the contents provider server allowing a pre-determined contents to be displayed or activated on a terminal when a hyperlink of the hyperlink message, transmitted to, stored in, and displayed on a terminal having at least communication means, display means, input means, storage means and control means, through a mobile communication provider server having at least communication means, billing means and control means, is selected, wherein the hyperlink message is configured to include at least hyperlink information designating a connection point of the contents which will be activated on the terminal, and free com-unication identification information indicating that a data communication fee normally charged to the terminal by the mobile communication provider server for the contents access is not to be charged, the communication means of the contents provider server is configured to connect to the mobile communication provider server to transmit the hyperlink message, and to connect to a connection point to transmit contents to be stored, and the control means of the contents provider server is configured to establish a connection between the terminal and the connection point by controlling the communication means while receiving the billing for the connection by the billing means of the mobile communication provider server when the hyperlink message, which has been determined to include the free communication identification information by the control means of the terminal, is selected, and then the connection is requested by the mobile communication provider server.

In this case, the hyperlink message may further include exemption range identification information indicating an exemption range, which is a limited range of exemption from the data communication fee normally charged to the terminal by the mobile communication provider server for the connection to contents. And preferably, at least one of the control means of the contents provider server or the control means of the connection point may accumulate parameters related to the exemption range set in the exemption range identification information during transmission and reception of the contents, and set the connection between the terminal and the connection point in such manner that it is allowed only when the accumulated parameters falls within the exemption range. In this case, it is preferred that the exemption range identification information may be (1) with respect to the terminal, at least one of a total packet size, a connection validity period, a number of connections, and a top folder of the connection point, (2) with respect to the connection point, at least one of a total packet size, a connection validity period, a number of connections, and a top folder of the connection point, or (3) with respect to the hyperlink message, at least one of a total packet size, a connection validity period, a number of connections, and a top folder of the connection point.

Meanwhile, the hyperlink message may further includes profit provision identification information indicating that a predetermined profit is to be provided to the terminal when a predetermined condition is satisfied through the connection to the contents. And preferably, at least one of the control means of the contents provider server and the control means of the connection point may accumulate parameters related to the predetermined condition set in the profit provision identification information during transmission and reception of contents and activation of the contents, and perform a process of the profit provision if it is determined that the accumulated parameters satisfy the predetermined condition. In this case, the profit may be at least one of a tangible or intangible present, a fortune gift, a coupon, points and cyber money.

Preferably, the condition for selecting a terminal to which the hyperlink message is to be delivered may be determined by the contents provider server and transmitted to the mobile communication provider server.

Preferably, the contents may be a contents that is to be made responses to one or more inquiry items, and the response may be stored in the field of a database on an Internet corresponding to the item when a response to each of the items is made. When the connection is disconnected before complete responses to all of the items have been made, and thereafter the connection is reconnected, it is preferred that activation starts from the item next to the item to which responses have been made.

Preferably, at least one of the control means of the contents provider server and the control means of the connection point may add predetermined information about terminals which are to be exempted from the communication fee for data transmission and reception by the contents provider server, to a vicarious payment beneficiary list, transmit the vicarious payment beneficiary list to the mobile communication provider server along with the hyperlink message, and perform setting whether the terminal can be connected to the connection point after determining whether the terminal requesting the connection is a terminal on the vicarious payment beneficiary list.

Preferably, the connection point may be controlled by the mobile communication provider server.

Advantageous Effects

The present invention having the above-described construction provides a mobile contents access, transmission and reception method which enables access without payment burden as conventional free SMS, by performing transfer of responsibility for payment, in which the communication fee for contents transmission and reception is charged to a contents provider server rather than a terminal, using a message including a predetermined free callback hyperlink which is set between a mobile terminal manufacturer, a mobile communication provider and a contents provider.

The transfer of responsibility for payment is restrictively performed only within a predetermined range previously set by the contents provider server, so that it is possible to estimate the cost to be paid by a contents provider server, and to provide and utilize contents planned in greater detail within an appropriate cost range, thereby resulting in the promotion of a sound mobile internet business and its related business. That is, communication is secured to be performed within an appropriate range without payment, thereby leading to the increased usage by a terminal, the increased advertising impact for an advertiser, the increased profits for a contents provider, and the security of communication fees for a mobile communication provider, and thus resulting in development of mobile internet related business.

That is, the present invention provides a concrete technology in which the terminal is exempted from paying a communication fee within a predetermined range for pre-determined total size of packets, the number of connections, and connection validity period and, at the same time, the contents provider vicariously pays the communication fee to the mobile communication provider within the predetermined range at the time of connecting to and using specific contents.

Furthermore, not only the terminal is exempted from paying the communication fee, but also, predetermined profits can be generated in the terminal through the usage of contents, thereby bringing profits to the terminal and, therefore, actively promoting the free utilization of contents.

In this case, a display method in which whether the hyperlink message is a message that is exempt from the communication fee and/or a message providing profits is checked through a predetermined indication displayed on the display means of the terminal is provided, thereby clearly identifying a conventional pay callback message and the free callback message of the present invention for appropriate usage thereof.

Meanwhile, because the contents provider server can control the time at which the hyperlink message is displayed on the terminal and the time at which the hyperlink message is deleted from the terminal, there are advantages in that messages are transmitted at discount communication rates time zone, activated at actively used time zone, and surely deleted without excessive messages being stored in the terminal.

Meanwhile, in the case of contents which needs response to a plurality of inquiry items, such as research, counting is performed immediately after responding, and successive response is possible through re-connection even when connection is cut off during responding, thereby resulting in the enhancement of the ease, speed, and accuracy of counting, and the convenience of responding during re-connection.

When exceeding a predetermined exemption range, a terminal can switch to a pay state to maintain the connection, thereby there is an advantage of continuously activating favorite contents through switching to a pay state.

Meanwhile, the present invention provides a mobile communication terminal, a mobile communication provider server and a contents provider server suitable for being used in the mobile contents access, transmission and reception method using a hyperlink message, thereby actively promoting the utilization of free callback message over the wireless Internet by replenishing the above-mentioned mobile communication terminal, the mobile communication provider server and the contents provider server.

BRIEF DESCRIPTION OF THE DRAWINGS

FIG. 1 is a diagram illustrating a mobile terminal, a mobile communication provider server and a contents provider server to which a mobile contents access and transmission and reception method using a hyperlink message (free callback message) according to the present invention is applied;

FIG. 2 is a diagram illustrating the frame structure of the hyperlink message used in the present invention.

FIG. 3 is a flowchart illustrating the operation of a mobile contents access and transmission and reception method using a hyperlink message according to the present invention;

FIG. 4 is a flowchart illustrating the operation of a contents provider server using a mobile contents access and transmission and reception method using a hyperlink message according to the present invention;

FIG. 5 is a flowchart illustrating the operation of a mobile communication provider server using a mobile contents access and transmission and reception method using a hyperlink message according to the present invention;

FIG. 6 is a flowchart illustrating the operation of a mobile communication terminal using a mobile contents access and transmission and reception method using a hyperlink message according to the present invention;

FIG. 7 is a flowchart illustrating a process in the case in which conditions for exempting a terminal from a communication fee are set in the mobile contents access and transmission and reception method using a hyperlink message according to the present invention;

FIG. 8 is an example of a screen displayed on the display means of a terminal using the mobile contents access, transmission and reception method using a hyperlink message according to the present invention;

FIG. 9 is a flowchart illustrating a process in the case in which conditions for providing with profits for a terminal are set in the mobile contents access, transmission and reception method using a hyperlink message according to the present invention;

FIG. 10 is a flowchart illustrating a process in the case in which a scheduled time at which the hyperlink message is displayed on the terminal is set in the mobile contents access, transmission and reception method using a hyperlink message according to the present invention;

FIG. 11 is a flowchart illustrating a process in the case in which a deleting time at which the hyperlink message is deleted from a terminal in the mobile contents access, transmission and reception method using a hyperlink message according to the present invention;

FIG. 12 is a flowchart illustrating a process in the case in which the utilized contents in the mobile contents access, transmission and reception method using a hyperlink message according to the present invention is a contents for soliciting responses to inquiry items; and FIG. 13 is a flowchart illustrating a process in the case in which switching to pay communication is set enabled when it exceeds the exemption range in the mobile contents access, transmission and reception method using a hyperlink message according to the present invention.

BEST MODE FOR CARRYING OUT THE INVENTION

The present invention having the above-described construction is described below in detail with reference to the accompanying drawings. Reference should now be made to the drawings, in which the same reference numerals are used throughout the different drawings to designate the same or similar components. Additionally, the term 'hyperlink message', defined and used in the present invention, includes hyperlinks for callback and free communication identification information which exempt a terminal from a communication fee, so that it sometimes called a 'Free callback message'.

FIG. 1 is a diagram illustrating a mobile terminal, a mobile communication provider server and a contents provider server to which a mobile contents access and transmission and reception method using a hyperlink message according to the present invention is applied.

FIG. 1(a) is an example of the construction of a system to which the present invention can be applied. The example is suitable for the supply of contents to a terminal 30 using Wireless Mark-up Language (WML) Script.

A contents provider 10 includes a main server 11, a WAP download server 12 and a phone server 13 which are connected thereto.

The main server 11 functions to provide contents data to the WAP download server 12 and the phone server 13 via uploading, and manages, amends, and controls it. Furthermore, the main server 11 may function to create the contents. The contents may includes a plurality of pieces of contents.

The WAP download server 12 mainly performs a function similar to that of the web server of an internet in the computer field, and provides various types of data based on the WAP protocol. That is, the WAP download server 12 may include one or more contents items, and identify terminal IDs to provide WAP contents during request. Furthermore, the WAP download server 12 may include WML Script.

The phone server 13 has a construction supporting Short Message Service (SMS) and a function of transmitting a hyperlink message of the present invention. Furthermore, the phone server 13 may manage the data for each contents user or may perform the advertisement targeting process.

In the mobile communication network 20, a Wireless Interface Gateway (hereinafter referred to as 'WIG') 21 is connected to the WAP download server 12, and a WAP G/W (WAP Gateway) 22 and an Inter-Working Function (IWF) 23 are connected to the WIG 21 in sequence. A SMS G/W (SMS Gateway) 24 is connected to the phone server 13, and SMSS 25 and SMSC 26 are connected to the SMS G/W 24 in sequence. A wireless switching center 27 and a base station 28 are connected to the IWF 23 and SMSC 26 in sequence.

The WAP G/W 22 is a gateway which performs a function of transformation between HTTP protocol stack and WAP protocol stack. The IWF 23 is a well-known device which functions as a gateway connecting a wireless network and a wired network.

The SMSS 25 performs a function of inter-working with an external network. The SMSC 26 is connected to the switching center 27 of a wireless network in a common line signal method (SS NO. 7) and stores and transmits short messages transmitted and received to and from respective terminals.

The base station 28 may include a plurality of base stations, and the terminal 30 is connected to the base station 28 in a wireless manner.

In the above-described construction, contents may be stored in a terminal using WML Script provided by the WAP download server 12.

FIG. 1(b) is another example of a system to which the present invention can be applied.

The difference from the example of FIG. 1(a) is that the WAP download server 12 is independent of the main server 11 (which means that it may be operated by other entity than the contents provider server), and the phone server 13 is connected to the WIG 21.

In the above-described construction, instead of WML Script, a Virtual Machine (VM) mounted in the terminal may provide a contents download function.

FIG. 1(c) is still another example of a system to which the present invention can be applied.

The difference with the example of FIG. 1(b) is that the WAP download server 12 is omitted, the phone server is connected to the WIG 21 and a Push Proxy Gateway (hereinafter referred to as a 'PPG') 29, the PPG 29 is connected to the WAP G/W 22 and the SMSS 25 is connected to the PPG 29.

In the above-described construction, the phone server 13 may transmit information about a target terminal and contents, thereby requesting a push, so that the PPG 29 may transform contents to be suitable for the wireless network using Push Access Protocol (PAP) and provide the contents to the terminal by WAP push using Push OTA (Over The Air) protocol.

However, FIGS. 1(a) to 1(c) are only examples representing a construction for enabling the flow of WAP data and SMS data with respect to the functions thereof. In practice, the contents provider system 10 may be implemented in various manners, and the component servers 11, 12 and 13 thereof may be integrated into one server. Furthermore, the mobile communication network 20 may be implemented in various manners, and the components 21 to 29 may be integrated into one server. In contrast, with respect to the terminal 30, each of its components may be divided according to the functions thereof, and thus be represented as a plurality of elements. However, it is easy to describe the technical characteristics of the present invention as being implemented as three entities, thus a construction in which all possible design modifications can be incorporated is described below.

FIG. 1(d) is another example of the construction of the system to which the present invention can be applied, which is represented from the above-described view point.

In this case, all of the functions of the contents provider system 10 are integrated into one server, which is called the "contents provider server 40". And all of the functions of the mobile communication network 20 are integrated into one server, which is called the "mobile communication provider server 50". The terminal 30 is a terminal having at least specific components, and is called a "terminal 60".

The mobile contents access, transmission and reception method using a hyperlink message of the present invention utilizes a system including the contents provider server 40, the mobile communication provider server 50 and the terminal 60.

The contents provider server 40 includes at least a control means 41 and a communication means 42, and further includes a connection point under the control thereof or under the control of other entity, for example, the mobile communication provider server 50. The connection point 43 means the location on the Internet corresponding to the URL designated by a hyperlink to be described below or a WAP page existing at the location, which refers to a page on which contents are actually accessed. The WAP page provided at the connection point 43 is generally uploaded and managed by the contents provider server 40, but upload and management by other entity is not excluded. A communication fee incurred by the connection to the WAP page and contents transmission and reception is charged to a predetermined entity, for example, the contents provider server 40, within a predetermined range.

Some or all of the functions of the contents provider server 40 may be under the control of the mobile communication provider server 50, or the mobile communication provider server 50 may act as the contents provider server 40.

The mobile communication provider server 50 includes at least a control means 51, a communication means 52, and a billing means 53. The billing means 53 determines a communication fee incurred by service provision including connection between the contents provider server 40 or the connection point 43 and the terminal 60 and data transmission and reception, and performs imposing and charging related to the fee. In general, the billing means 53 includes a database for a plurality of users to whom mobile communication service is provided, and performs billing by assigning a communication fee to the record of a corresponding user in the database. After the billing, accounting is performed through credit card payment or cash payment, billing and accounting being separate matters.

The terminal 60 includes a control means 61, a communication means 62, an input means 63, a storage means 64 and a display means 65. The input means 63 is the means of enabling a user to convey a command to the terminal, and is generally composed of keys or buttons. The storage means 64 has a memory construction of storing various programs and data, and is classified into volatile memory and non-volatile memory. In the present invention, this is used for the storage of hyperlink messages, predetermined icons, a exemption range parameters, or the like. The display means 65 performs visual, acoustic, and tactile output to users, and includes a screen (conventionally an LCD screen), a speaker, a light emitting means and a vibration means, or the like.

Each of the respective control means 41, 51 and 61 is the means for controlling the other means, and may be in general an intangible means implemented using a program.

Each of the respective communication means 42, 52 and 62 is the means taking charge of the establishment and connection of physical communication, and data transmission and reception therethrough, and may be implemented using, for example, one of the specific constructions of FIGS. 1(a) to 1(c), in which embodiments based on other constructions are not excluded.

The present invention transmits a hyperlink message from the contents provider server 40 to the terminal 60 via the mobile communication server 50 by utilizing hardware resources having the above-described constructions. The structure of the hyperlink message is illustrated in FIG. 2.

FIG. 2 is a diagram illustrating the frame structure of a hyperlink message used in the present invention. The hyperlink message is displayed on the display means of a terminal, immediately, or a predetermined time later after arriving at the terminal.

The hyperlink message mainly includes a header, control information, a hyperlink, and text. Although not shown, the hyperlink message may further include multimedia data.

The header is a region containing a unique ID which is assigned to each hyperlink, an overall message size, and information about the accompanying components. The header may include information about the number of pieces of multimedia data, the size of control information, the start point of a time span, and the period of the time span, or the like. The header is almost the same as a conventional file header.

The control information may be divided into general control information and special control information.

When a hyperlink message has a plurality of pieces of multimedia data, the general control information is information designating a mapping rule for memory after decompression of the multimedia data.

The special control information is inventively proposed in the present invention, and may include free communication identification information representing whether free communication is possible, exemption range identification information representing parameters for limiting free communication, profit provision identification information indicating whether a predetermined profit is provided, activation identification information representing the time at which the hyperlink message itself is activated or the time at which the hyperlink message itself is deleted, or arrival notification information designating various settings during arrival or display of the hyperlink, or the like, which will be described below in detail.

The hyperlink is visually displayed on the display means, and is a component indicating a URL of a connection point to be connected to if selected. A plurality of hyperlinks may be set.

The text refers to phrases displayed before or after the hyperlink. Various phrases suggesting connection may be set.

In order to realize the method of the present invention, first, the hyperlink message is constructed so as to include at least hyperlink information designating the connection point 43 of contents to be activated in the terminal 60, and free communication identification information indicating that the communication fee for data transmission and reception, normally charged to the terminal by the mobile communication provider server 50 for the connection to the contents, is not to be charged. Furthermore, the hyperlink information and the free communication identification information included in the hyperlink message are beforehand set in such manner that it is interpreted as having the same meaning by, in common, all the control means of the contents provider server 40, the mobile communication provider server 50, the terminal 60 and, occasionally, the connection point 43.

The present invention relates to a technology in which, when the hyperlink message having the above-described structure, which is transmitted from the contents provider server 40 to the mobile communication provider server 50 and then from the mobile communication provider server 50 to the terminal 60, and is stored in and displayed on the terminal 60, is selected by the user, a predetermined contents are displayed on and activated in the terminal without billing the terminal 60.

FIG. 3 is a flowchart illustrating the operation of a mobile contents access, transmission and reception method using a hyperlink message according to the present invention. Furthermore, FIG. 4 is a flowchart illustrating the operation of a contents provider server using the mobile contents access, transmission and reception method using the hyperlink message according to the present invention. FIG. 5 is a flowchart illustrating the operation of the mobile communication provider server using the mobile contents access, transmission and reception method using a hyperlink message according to the present invention. FIG. 6 is a flowchart illustrating the operation of a mobile communication terminal using the mobile contents access and transmission and reception method using a hyperlink message according to the present invention.

First, the contents provider server 40 transmits a hyperlink message to the mobile communication provider server 50 at step 110, 210, or 310. The mobile communication provider server 50 transmits the hyperlink message to the terminal 60 at step 120, 340, 410. At this time, the mobile communication provider server 50 determines whether the free communication identification information is included in the hyperlink message at step 320, and, if included, adds predetermined information about the hyperlink message and terminals related to an exemption beneficiary list at step 330.

The terminal 60 determines whether the free communication identification information is included in the hyperlink message immediately during receipt of the hyperlink message at step 420. The determination is performed by the control means 61. If, as a result of the determination, free communication identification information is not included, the received hyperlink message is treated as a general hyperlink message, and the entire communication fee for contents data transmission and reception is charged to and stored in for the terminal 60, as in the prior art. In this case, explanation for subsequent steps are omitted here.

However, if it is determined that free communication identification information is included in the hyperlink message, the received hyperlink message is determined to be a unique hyperlink message of the present invention, and steps are taken on the assumption that the communication fee for contents data transmission and reception is to be charged to and stored in for the contents provider server 40 within a predetermined range, unlike the prior art. For this, the terminal 60 provides a pre-determined free communication indication to the display means 65, which then displays the hyperlink message at step 130 or 430. If option is not set, the hyperlink message is displayed immediately after the determination. The setting of option refers to the case in which the scheduled time, described below, is set.

Thereafter, when the hyperlink of the hyperlink message is selected by the user during standby at step 140 or 440, a request for access to the connection point 43 is generated at step 150, 350, or 450 from the terminal 60 to the mobile communication provider server 50.

The connection point 43 is considered conventionally a WAP page, but other connection points, for example, an FTP similar page, with which only the download of a file is possible, may be included. Furthermore, with respect to generation, deletion, amendment, and control, the connection point 43, as illustrated in FIG. 1(*d*), is preferably managed by the contents provider server 40. However, the present invention is not limited to this, and the case in which the connection point is managed by the mobile communication provider server 50 or by a third party, or the contents provider server 40 acts as the connection point, or the like is not excluded. The hyperlink message is selected by the input means 63, and whether the hyperlink message is selected is determined by the control means 61, and a connection request is made by the communication means 62 under the control of the control means 61.

In response to the connection request from the terminal 60, the mobile communication provider server 50 establishes such connection at step 160 or 360. At this time, whether free connection is permitted is determined such a way to determine whether it is a connection request from a terminal 60 on the exemption beneficiary list at step 350 and, the connection is permitted only if it is such a connection request at step 360. The terminal 60 provides the URL of the connection point 43 to the mobile communication provider server 50, the such a connection method being able to be established by well-known technology.

Through the connection 230 between the terminal 60 and the connection point 43, handled by the mobile communication provider server 50, the contents are activated in the terminal 60 at step 160 or 460. In this case, with respect to the terminal 60, the transmission and reception of the contents are performed by the communication means 62, and the activation of the contents are performed by the display means 65. Furthermore, whether the connection between the terminal 60 and the connection point 43 is established is set so as to be detected by the contents provider server 40. For this purpose, the connection point 43 may report on this to the contents provider server 40, or the contents provider server 40 may always monitor the connection status of the connection point 43, or the contents provider server 40 may itself serve as the connection point 43. In the case in which the contents provider server 40 must take action required for the connection between the connection point 43 and the terminal 60 in order to establish the connection, it is natural to take action required for the connection at step 240. The above-described procedure can be performed using well-known technology.

The contents may be various, for example, moving images such as advertisements, surveys such as questionnaires, research contents, images for the provision of a discount coupon, game test versions and the like, but the present invention is not limited to these. Furthermore, moving images such as MPEG or Audio Visual Interleaved file (AVI), Flash movies, and still images are included. Furthermore, the existence of sound, vibrations and light illumination is not taken into account.

When the connection is terminated for various reasons, such as a command given to the terminal 60 by a user or the below-described limitation of the exemption range after the contents has been used according to the activation, the mobile communication provider server 50 calculates a communication fee for data transmission and reception to be charged for the connection using the billing means 53. In this case, the determination of a data usage amount (total packet size) between the terminal 60 and the connection point 43 and the calculation of a communication fee based on the amount can be performed by the billing means, implemented using well-known technology. However, in the present invention, the hyperlink message includes the free communication identification information. When the connection is established by the hyperlink message, and a predetermined range, to be described below, is set, the control means 51 controls the billing means 53 such that the fee is stored as the billing information of the contents provider 40 rather than the billing information of the terminal 60 within the predetermined range at step 170 or 370. Of course, billing and accounting are performed based on the billing information thereafter.

The operation of the contents provider server 40, the mobile communication provider server 50 and the terminal 60 are preferably performed by the control means 41, 51 and 61 implemented using software based on a conventional programming skill, but the case of firmware being constructed to have the above-described function and the control means 41 being physically implemented as a function block having the firmware is not excluded. Furthermore, with respect to the billing means 53, using a conventional simple billing means, the present invention may be implemented by the control means 51 constructed to perform control according to the present invention. Otherwise, a specific billing means 53 constructed to store billing information properly according to the present invention may be prepared and the control means 51 may provide only basic information to the billing means 53.

Meanwhile, the contents provider server 40 is an entity for creating the hyperlink message and determining to which terminal 60 the hyperlink message is transmitted. The reason for this is why the contents provider server 40 selects the target to which the hyperlink message is to be delivered, directly or based on an order from a client (advertisement cooperation or research cooperation).

As a result, a condition for selecting the terminal 60 to which the hyperlink message is delivered is determined by the contents provider server 40 and is transmitted to the mobile communication provider server 50. Of course, the mobile communication provider server may act as the contents provider server 40. In this case, when the entity for selecting the terminal 60 and the entity for delivering the hyperlink message are separated from each other, the entity for selecting the terminal can be considered as the contents provider server 40.

Furthermore, when the determination of whether communication is to be performed at no charge is done by the contents provider server 40 or the connection point 43, examining free communication identification information set in the hyperlink message imposes a burden on the contents provider server 40 or the connection point 43. Therefore, the list of the terminals 60 having free communication identification information is previously generated as a vicarious payment beneficiary list in the contents provider server 40 or the connection point 43, and then an actually connected terminal 60 is compared with the list, thereby efficiency is achieved. The list is the list of target terminals 60 which are selected by the contents provider properly according to the request of the client.

For this purpose, at least one of the control means 41 of the contents provider server 40 and the control means (not shown) of the connection point 43 adds predetermined information about the terminal 60 which are exempted from a communication fee for data transmission and reception by the contents provider server 40, for example, terminal IDs and telephone numbers, to a vicarious payment beneficiary list at step 110 or 210 and transmits the vicarious payment beneficiary list to the mobile communication provider server 50 along with the hyperlink message at step 110 or 220. The determination whether the terminal 60 can be connected to the connection point 43 is made after determination of whether the terminal 60 requesting the connection is a terminal on the vicarious payment beneficiary list. The determination is performed by comparing information on the list such as terminal IDs or telephone numbers etc.

Furthermore, when the determination of whether communication is to be performed at no charge is done by the mobile communication provider server 50, examining free communication identification information set in the hyperlink message imposes a burden on the mobile communication provider server 50. Therefore, the list of the terminals 60 having free communication identification information is previously generated as an exemption beneficiary list in the mobile communication provider server 50, and then an actually connected terminal 60 is compared with the list, thereby efficiency is achieved. The list is the list of target terminals 60 which are selected by the contents provider properly according to the request of the client.

For this purpose, the control means 51 of the mobile communication provider server 50 receives from the contents provider server 40 the vicarious payment beneficiary list storing the predetermined information about the terminal 60 which are exempted from a communication fee for data transmission and reception by the contents provider server 40, and adds the predetermined information in the vicarious payment beneficiary list to an exemption beneficiary list at step 120 or 330. The determination whether the terminal 60 can be connected to the connection point 43 is made after determination of whether the terminal 60 requesting the connection is a terminal on the vicarious payment beneficiary list. The determination is performed by comparing information in the list such as terminal IDs or telephone numbers etc.

FIG. 7 is a flowchart illustrating a process in the case in which "a condition for exempting a terminal from a communication fee" is set in the mobile contents access and transmission and reception method using a hyperlink message according to the present invention. The condition is a condition in which the contents provider server 40 pay the mobile communication provider server 50 the communication fee for data transmission and reception instead of the terminal 60. By setting the condition, the contents provider server 40 can perform control so as to pay the fee within the range necessary for the purpose of the contents to be provided.

In order to set the condition, the hyperlink message further includes "exemption range identification information" representing an exemption range which is a limited range within which the contents provider server 40 pays the communication fee for data transmission and reception for the terminal 60, which would otherwise be charged to the terminal 60, thereby not being charged to the terminal 60 in prior art. That is, the hyperlink message must include the exemption range identification information as well as the hyperlink representing the connection point 43 and free communication identification information.

The examination of the exemption range identification information and control in accordance therewith can be performed by the contents provider server 40, the mobile communication provider server 50 or the terminal 60, each case being described below.

The control means 61 of the terminal 60 determines whether the exemption range identification information is included in the hyperlink message at step 510, and, if included, accumulates a parameters related to the exemption range set in the exemption range identification information at the time of transmitting and receiving the contents at step 160 or 460. The connection between the terminal 60 and the connection point 43 is allowed only when the accumulated parameters falls within the exemption range, that is, if it falls outside the exemption range at step 520, the connection is disconnected at step 530.

Alternatively, the control means 51 of the mobile communication provider server 50 stores information about terminals, such as their IDs and telephone numbers, and a list of exemption ranges corresponding thereto, before transmitting the hyperlink message including the exemption range identification information to the terminal 60, determines whether the terminal is included in the list at step 510 when a connection is requested from the terminal 60, and, if included, accumulates the parameters related to the exemption range set in the exemption range identification information at the time of transmitting and receiving the contents. Connection between the terminal 60 and the connection point 43 is allowed only when the accumulated parameters falls within the exemption range, that is, if it falls outside the exemption range at step 520, the connection is disconnected at step 530.

Alternatively, either one of the control means 41 of the contents provider server 40 and the control means (not shown) of the connection point 43 stores information about terminals, such as their IDs and telephone numbers, and a list exemption ranges corresponding thereto, before transmitting the hyperlink message including the exemption range identification information to the terminal 60, and, when a connection is requested from the terminal 60, determines whether the terminal is included in the list at step 510, and, if included, accumulates parameters related to the exemption range set in the exemption range identification information at the time of transmitting and receiving the contents. The connection between the terminal 60 and the connection point 43 is allowed only when the accumulated parameters falls within the exemption range, that is, if it falls outside the exemption range at step 520, the connection is disconnected at step 530.

That is, regardless of who performs the control, the entity performing the control accumulates related parameters and permits the connection only when the accumulated parameters falls within the exemption range. Therefore, there is an advantage in that the free connection of the terminal 60 is limited to a predetermined range determined by the contents provider server 40 which creates the hyperlink message.

Meanwhile, the exemption range identification information may be:

(1) with respect to the terminal 60, at least one of the total packet size, the connection validity period, the number of connections, and the top folder of the connection point, (2) with respect to the connection point 43, at least one of the total packet size, the connection validity period, the number of connections, and the top folder of the connection point, (3) with respect to the hyperlink message, at least one of the total packet size, the connection validity period, the number of connections, and the top folder of the connection point.

That is, the total packet size, the connection validity period the number of connections, and the top folder of the connection point can be limited, or a combination of thereof may be set. Furthermore, they can be set to act as limitations on individual terminals, limitations to access to one connection point, or limitations to overall access using one type hyperlink message.

The total packet size refers to the total size of accumulated packets generated by the connection between the terminal 60 and the connection point 43 and the data transmission and reception. The connection validity period refers to a period during which connection using the hyperlink message is allowed. The number of connections refers to the allowed number of connections using the hyperlink message. The top folder of the connection point indicates that the top folder accessible by the connection using the hyperlink message is a limit, and that subfolders of that folder are set to be accessible.

The above-described information is special control information used only in the present invention, and may be set by altering the values of conventional fields of the hyperlink message, or may be newly set by using a reserved area and taking a reserved value as a meta information field value.

Examples of the free communication identification information and the exemption range identification information are described.

The case in which the hyperlink message includes the contents of URL, 77=Free, 200 Kb, 3 times, 6 hrs is described. In this case, "URL" means the URL of the connection point 43, visited when the hyperlink portion of the hyperlink message is clicked. "200 Kb" means the total packet size which is the limited total size of transmitted and received packets at the time of the usage of contents using the hyperlink message. "3 times" means the number of connections, which limits the number of connections. "6 hrs" indicates that connection is possible within 6 hours from reception of the message.

The use of numeral 77 as the free communication identification information indicates the service type. This is called Teleservice ID, or TID. For conventional mobile communication providers, the service type of the conventional pay callback message is set to service-type or TID=5. When TID is set to 5, a communication fee for data transmission and reception is charged to the terminal 60. In the present invention, a different type of service in which the communication fee for data transmission and reception is charged to the contents provider server 40 is provided, so that the TID is set to 77 for identification. Of course, another numeral or character may be used instead of numeral 77, as long as this is accepted as a protocol.

The terminal 60 checks the service type code, and, if it is a code allowing free communication, determines that it is a free callback message which exempts the terminal 60 from a communication fee for the data transmission and reception, that is, the hyperlink message of the present invention.

When it is determined that it is a free callback message, the terminal 60 clearly displays that it is the free callback message using a predetermined free communication indicator, which is an icon on a display device.

For the total packet size, connection validity period, the number of connections, and the top folder of the connection point of the exemption range identification information, related parameters can be entirely checked and controlled by a terminal, a mobile communication provider server, or by a contents provider server, but it is possible to properly combine and divide the parameters.

For example, the contents provider server 40 sets contents related to the limitation of the total packet size to each terminal 60 in information about the total packet size for the terminal, which is special control information of the hyperlink message. When the terminal 60 which initiates a connection via the hyperlink message checks and follows this parameters, the maximum payment expense is the amount of transmitted message * per-terminal total packet size because the contents provider server 40 knows the number of terminals 60 which transmit the hyperlink message, thereby clearly calculating the upper limit of the total communication fee resulting from the connection through the hyperlink message.

Alternatively, the contents provider server 40 assigns a URL to the connection point 43 and sets contents indicating that access to folders lower than a specific folder, the "top folder of connection point", is possible, which is the special control information of the hyperlink message. When the connection point 43 checks and controls this parameters, the contents provider server 40 prevents the terminal 60 from accessing folders higher than the folders in the limited range when connection is performed through the hyperlink message, thereby obviously controlling the range of folders as the range of validity for which a communication fee is paid.

In another embodiment, the contents provider sets contents restricting the connection validity period and number of connections of each terminal in the fields "connection validity period" and "number of connections". When the terminal 60 checks and controls these parameters, connection to the connection point 43 is determined to be impossible if the connection validity period has expired or the number of connections has been exceeded, so that the contents provider server 40 can obviously control the range of validity for which a communication fee is paid through the hyperlink message during connection.

FIG. 8 is an example of a screen displayed on the display means of a terminal using the mobile contents access, transmission and reception method using a hyperlink message of the present invention.

The hyperlink message of the present invention is analyzed by the control means 61 of the terminal 60 immediately during transmission. If, as a result of the analysis, it is determined that free communication identification information is included therein, the control means 61 displays the title thereof and, at the same time, performs the display of free communication information on the display means 65 in order to announce the arrival of the hyperlink message. The display of free communication information may be implemented using a dedicated icon, a dedicated melody, a dedicated voice announcement, a dedicated pattern of lamp illumination or flickering, a dedicated pattern of vibration, or the combination thereof.

FIG. 8(*a*) illustrates an example of the conventional icon of a pay callback message, and FIG. 8(*b*) illustrates an example of the icon of the free pay callback message of the present invention. The conventional icon may be a letter envelope-shaped icon. However, as long as such an icon is used in common for all callback messages, pay callback messages and free callback messages of the present invention can not be distinguished. Therefore, as illustrated in FIG. 8(*b*), a letter envelope-shaped icon, in which the word "FREE" means there is no charge, may be used. Of course, the icon to be applied to the free callback message of the present invention is not limited to the letter envelope-shaped icon or to the word "FREE". Any form of icon which can be distinguished from the conventional icon for paid callback messages can be used for the free callback message of the present invention.

The display of free communication information is not limited to the dedicated icon. For visual indication, lighting and flickering a lamp may be conducted for the indication of free communication, as alternatives to the icon. For acoustic indication, a dedicated melody (including chimes) or a voice announcement (for example, "a free callback message has arrived") may be used for the indication of free communication besides the icon. Furthermore, for tactile indication, vibration having a specific pattern may be used for the indication of free communication. Any type of indication can be used, as long as it enables the user of the terminal 60 to recognize the arrival of a free callback message.

Furthermore, the hyperlink message may be assigned to a dedicated message box and displayed on the display means.

FIG. 8(*d*) illustrates an example of a message box illustrated on the display means 65 of the terminal 60. In this case, the menu item 'message box' includes the sub-menu items "SMS message box" and "free connection message box". Of course, the menu item 'message box' may be displayed as a separate upper menu item, and a separate button may be assigned thereto.

FIG. 8(*f*) is an example of a screen in the case in which the free connection page is selected. In this case, the titles of a plurality of hyperlink messages to which the dedicated icon of FIG. 8(*b*) is assigned can be seen. Along therewith, the dedicated melody and the dedicated voice announcement may be output, a dedicated pattern of lamp lighting or flickering may be performed, and a dedicated pattern vibration can be performed.

For example, when "the sky is blue . . . let's go out" corresponding to 1 of FIG. 8(*f*) is selected, the contents thereof can be seen. For example, a sentence, such as "blue sky in autumn . . . let's go somewhere . . . let's start right now Select here for international cyber travel"

may be displayed. In this case, "international cyber travel" is a hyperlink. When the hyperlink is clicked, connection to the connection point 43 of a predetermined URL is performed. Furthermore, a communication fee for the connection is not charged to the terminal 60 within a predetermined range.

FIG. 9 is a flowchart illustrating a process in the case in which conditions for generating profits in a terminal are set in the mobile contents access, transmission and reception method using a hyperlink message of the present invention. The contents provider server 40 not only eliminates a connection fee of the terminal 60, but can also take an action to generate some profit for the terminal 60. For example, in the case in which there is a response to a survey, a predetermined reward for the response to the survey is provided. In the case in which an advertisement is viewed, a reward for the advertisement viewing is provided.

For this, the hyperlink message created by the contents provider server 40 may further include profit provision identification information, indicating that a pre-determined profit is provided in the terminal 60 when a predetermined condition is satisfied through connection to the contents. That is, the hyperlink message includes profit provision identification information as well as a URL to the connection point 43 and free communication identification information.

When the hyperlink message arrives at the terminal 60, the control means of the terminal 60 checks whether profit provision identification information is included in the hyperlink message at step 610. Depending on whether profit provision identification information exists, the hyperlink message is regarded as conventional pay callback message or as a free callback message of the present invention. If it is determined that profit provision identification information is included therein, a pre-determined indication for profit provision is added to the hyperlink message and then is displayed on the display means 65 at step 620.

In this case, the indication for profit provision may be implemented using a dedicated icon, a dedicated melody, a dedicated voice announcement, a dedicated pattern of lamp illumination or the flickering, a dedicated pattern of vibration, or the combination thereof. Furthermore, the hyperlink message is assigned to a dedicated message box and is displayed on the display message.

FIG. 8(*c*) illustrates an icon which is an example of the indication for profit provision. The icon has a lucky bag shape, but the present invention is not limited to this. Any type of icon may be used, as long as it is distinguishable from the icon of the conventional pay callback message illustrated in FIG. 8(*a*) and from the icon of the conventional pay callback message, illustrated in FIG. 8(*b*).

FIG. 8(*e*) is an example in which a free connection message box is displayed on the display means, where it can be seen that the menu item "profit provision page" is included in a menu. Of cause, the profit provision page may be set to be represented in a parent menu, or the profit provision message box may be independently installed.

FIG. 8(*g*) is an example of a screen in the case in which the profit provision page is selected. The titles of a plurality of hyperlink messages are displayed on the profit provision page with dedicated icons assigned. In this case, for example, number 1 "universal family restaurant coupon" is selected, for example, "get a coupon usable in all family restaurants", and
"Select here universal coupon"

may be displayed. The limitless coupon is a hyperlink, which enables connection to the connection point 43 of a predetermined URL.

When the hyperlink is selected, as illustrated in FIG. 3, a process for eliminating the communication fee of a terminal is performed, and, at the same time, at least one of the control means 41 of the contents provider server 40 and the control means (not shown) of the connection point 43 accumulates information, such as parameters, such as a minimum advertisement time and the minimum number of survey response items, related to the predetermined condition set in the profit provision identification information during the transmission and reception of the contents and during activation of the contents at step 640. Thereafter, if, during usage of the contents, is it determined that the accumulated parameters satisfies the predetermined condition for profit provision, a process for profit provision is performed at 650. The process for profit provision refers to remittance on-line or off-line, present delivery, a fortune gift, a coupon, payment of cyber money, or the accumulation of points, which can be implemented using known technology.

In this case, the revenue may be set to at least one of a tangible or intangible present, a fortune gift, a coupon, points and cyber money. The present includes an intangible service type present or cash. Each of the fortune gift, the coupon, the points and the cyber money are broadly interpreted to include all means for providing pre-determined economical profits or psychological profits, regardless of any difference between related names. Therefore, cyber money includes, for example, e-money, electric money and cyber cash. Similarly, the definition of "coupon" and "points" must be broadly interpreted.

FIG. 10 is a flowchart illustrating a process in the case in which a scheduled time at which the hyperlink message is displayed is set in the mobile contents access, transmission and reception method using a hyperlink message of the present invention.

Occasionally, it may not be preferable that the hyperlink message is displayed on the display means 65 immediately after arrival in the terminal 60. For example, after the contents provider server 40 silently transmits the hyperlink message to the terminal 60 during a period in which a communication fee is discounted, such as late at night or early in the morning, the hyperlink message may be displayed on the display means during lunch break, when the terminal 60 is most actively used. As a result, the communication fee that the contents provider server 40 must pay is greatly reduced.

For this purpose, the hyperlink message created by the contents provider server 40 further includes scheduled time identification information, which designates the time at which the hyperlink message is displayed on the display means 65. That is, the hyperlink message must include the appointment time identification information as well as the hyperlink and the free communication identification information.

When the hyperlink message arrives in the terminal 60, the control means 61 of the terminal 60 checks whether scheduled time identification information is included in the hyperlink message at step 710. If it is not included, the hyperlink message is regarded as a conventional pay callback message or a free callback message of the present invention, depending on whether there is the profit provision identification information. If scheduled time identification information is included, the hyperlink message is not immediately displayed on the display means 65, and neither is any indication of free communication. That is, the terminal 60 receives the hyperlink message, but does not do anything.

Furthermore, the control means 61 determines whether the scheduled time is reached at step 720, and, if reached, displays the hyperlink message on the display means 65 at step 730. The determination of whether the scheduled time is reached is performed using a conventional method of setting and checking a timer or events in the control means 61 of the terminal 60.

FIG. 11 is a flowchart illustrating a process in the case in which the hyperlink message is deleted from a terminal at a deletion time in the mobile contents access, transmission and reception method using a hyperlink message of the present invention.

Occasionally, there is a case in which a hyperlink message is deleted. For example, in the case in which there is the concern that storage space for new messages is not sufficient, the contents provider server 40 can control this in advance. Furthermore, if it has been determined that it is preferable that the hyperlink message simply be deleted, regardless of whether the connection validity period of contents is set as exemption range identification information, the contents provider server 40 indicates this in advance in specific control information when creating the hyperlink message. That is, a detection time refers to a programmed suicide time of the hyperlink message.

For this, the hyperlink message created by the contents provider server 40 further includes deletion time identification information which designates the time at which the hyperlink message is to be deleted from a storage means. That is, the hyperlink message must include the deletion time identification information as well as the URL of the connection point and the free communication identification information. When the hyperlink message arrives in the terminal 60, the control means 61 of the terminal 60 checks whether the deletion time identification information is included in the hyperlink message at step 810. If not included, the hyperlink message is regarded as a conventional pay callback message or a free callback message of the present invention depending on whether there is profit provision identification information. If it has been determined that deletion time identification information is included, whether the deletion time is reached is checked at step 820, and the hyperlink message is deleted from the storage means after the deletion time has been reached at step 830. Whether the deletion time has been reached is determined using a conventional method of setting and checking a timer or events in the control means 61 of the terminal 60.

FIG. 12 is a flowchart illustrating a process in the case in which utilized contents are contents for soliciting responses to inquiry items in the mobile contents access, transmission and reception method using a hyperlink message of the present invention.

Generally, in the case of something like questionnaires required in research, the details of the contents are composed of questions and responses, and a large amount of information must be statistically processed in order to be clear at one glance, and it takes a long time to use such contents. Up to now, when a connection is disconnected during a survey, the questions resume from the beginning, thus there is the inconvenience of repeated responses. In the case of such interactive contents, using the present invention which exempts a terminal from a communication fee, the usage of contents is further promoted.

Therefore, the contents applied to the present invention is contents for soliciting responses to one or more inquiry items, such as a survey, and it is preferred that, when a response to each of the items is made, the response be stored in the field of a database on the Internet corresponding to the item.

For example, according to the present invention, described with reference to FIG. 3, when the hyperlink message includes free communication identification information, an indication of such free communication is displayed on the display means 65 of the terminal 60, and connection to the connection point 43 is performed at no charge in response to selection of this, the contents being the details of a survey as in FIG. 12(*a*), and a WAP database corresponding one-to-one therewith, as in FIG. 12(*b*). Thereafter, when question 1 for color and question 2 for music genre are displayed on the display means 65 of the terminal 60, as illustrated in FIG. 12(*a*), and then responses, such as '2. yellow', '2. trot' and so on, are selected, the responses are sequentially input to the corresponding fields of the database. That is, the connection point 43, which receives the responses, stores the responses in the variables of the corresponding fields of the database, and replaces the variables with field values.

Meanwhile, in another terminal 60, when connected to the contents using the method of the present invention, response is also performed sequentially. In this case, when responses, such as '1. red' to question 1, and '3. ballad' to question 2, are selected, they are sequentially stored in the corresponding fields of the subsequent record (record number 2) of the database.

Furthermore, in still another terminal 60, when connected to the contents, responses such as '3. blue' to question 1, and '1. pop' to question 2, are selected, they are sequentially stored in the corresponding fields of the subsequent record (record number 3) of the database.

Using such a method, when a consumer of contents, such as a survey, for example, a research survey, makes a response, there is an advantage in that rapid counting is possible by sequentially inputting and storing the responses to and in the corresponding fields of the database.

Meanwhile, at the time of using such contents, there is a case in which connection is terminated during response. In particular, because the wireless internet is used, there are areas to which electric waves do not propagate. Connection may be disconnected during passing through such an area. Thereafter, during re-connection, it is preferred that questions, to which responses have been made, be skipped, and then subsequent questions be presented.

For this, when the connection is disconnected before responses to all of the items have been made and the connection is reconnected, it is preferred that activation start from an item next to items, to which responses have been made. That is, the ID of the terminal, the ID of the contents and the ID of the inquiry item are stored in part of the terminal 60, the contents provider server 40 or the connection point 43 (for example, the variable of a current field can be used), it is updated every time a response to each inquiry item is made, and the start number of a question to be activated is determined with reference to the ID of the latest inquiry item during re-connection subsequent to the interruption of the connection.

For example, in the case in which the connection is terminated after a response to question 2 for music genre has been completed as shown in FIG. 12(*c*), control is performed such that question 3 for food is subsequently activated with reference to the latest response number when the terminal 60 achieves re-connection.

FIG. 13 is a flowchart illustrating a process in the case in which switching is performed to pay for communication when falling outside an exemption range in the mobile contents access and transmission and reception method using a hyperlink message of the present invention.

Occasionally, when the contents provider server 40 exceeds the exemption range within which a communication fee is not charged to the terminal 60, the continued usage of contents may be desired even though the terminal 60 must pay a communication fee. For example, when the contents are a moving picture for a preview of a new movie, and the range of exemption from a communication fee is limited to the amount corresponding to the first 20 minutes of the movie, the connection is disconnected after the first 20 minutes of the movie have been transmitted, and thus the user of the terminal 60 wants to pay to continue to watch the movie.

In this case, since parameters assigned to the exemption range identification information, for example, accumulated parameters for total packet size, exceeds the exemption range, and the connection between the terminal 60 and the connection point 43 has been set such that the connection is impossible, whether to switch to a fee-charged state is determined at 910. When switching to a fee-charged state, the control means 61 of the terminal 60 deletes the exemption communication identification information of the hyperlink message and the connection between the terminal 60 and the connection point 43 is set that it is possible by the communication means 62 at step 920. Thereafter, the terminal 60 transmits a connection request, for connection to the connection point 43, to the mobile communication provider server 50, and the mobile communication provider server 50 permits this and stores a related communication fee as billing information for the terminal 60 at step 930, because there is no free communication identification information. Furthermore, since there is no free communication identification information, the contents provider server 40 and the connection point 43 must also permit connection that is not processed as a vicarious payment beneficiary.

Furthermore, there is the case in which the connection point 43 is not under the control of the contents provider server 40. For example, the mobile communication server 50 directly establishes, manages and controls the connection point 43. In this case, the connection point 43 is constructed to be controlled by the mobile communication provider server, but this does not depart from the scope of the present invention if a fee related to the connection of the terminal 60 to the connection point 43 is managed and billed according to the method of the present invention.

Until now, the method of the present invention has been described, such a method being easily implemented using a predetermined programming method.

Furthermore, the system of the terminal 60, the mobile communication provider server 50 and the contents provider server 40, suitable for use in implementing the mobile contents access and transmission and reception method using a hyperlink message described above, are provided.

The contents provider server 40 is mainly composed of a control means 41, which controls a communication means 42 and the connection point 43, adds predetermined information to a vicarious payment beneficiary list, permits connection to the vicarious payment beneficiary list by the terminal 60, and accumulates predetermined connection-related information. The control means 41 can be implemented using a device in which a computer program module is designed to perform the function thereof, or using a program embedded as firmware.

The mobile communication provider server 50 is mainly composed of a control means 41 which controls a communication means 52 and a billing means, adds the pre-determined information of the terminal, to which a hyperlink message including free communication identification information has been transmitted, to an exemption beneficiary list, permits connection from the terminal 60 of the exemption beneficiary list, accumulates predetermined connection-related information, and assigns the communication fees to the contents provider server 40, and a billing means 53 for storing communication fees as the billing information of the contents provider server 40 in response to the command from the control means 51. Each of the control means 51 and the billing means 53 can be implemented using a device in which a computer program module is designed to perform the function thereof, or using a program embedded as firmware.

The terminal 60 is mainly composed of a control means 61 which controls a communication means 62, an input means 63, a storage means 64 and a display means 65, displays free communication identification information on the display means 65 along with an indication of free communication when this is included in the hyperlink message, and connects with the connection point thereof and transmits, receives, and activates contents when the hyperlink is selected. The control means 61 can be implemented using a device in which a computer program module is designed to perform the function thereof, or using a program embedded as firmware.

The mobile communication terminal 60, the mobile communication provider server 50 and the contents provider server 40 system correspond to the methods of the present invention in a one-to-one manner. Furthermore, exemption range identification information, profit provision identification information, appointment time identification information, and deletion time identification information, which are all subordinate concepts, correspond to the methods of the present invention in a one-to-one manner. Therefore, detailed descriptions of related parts are omitted for the mobile communication terminal 60, the mobile communication provider server 50 and the contents provider server 40 system.

Each of the mobile communication terminal 60, the mobile communication provider server 50 and the contents provider server 40 system of the present invention can be implemented using a device in which a computer program module is designed to perform the function thereof, or using a program embedded as firmware.

Although the present invention is described in connection with specific embodiments, the technical sprit of the present invention is not limited thereto, and it will be apparent that those skilled in the art can variously modify them within the scope of the present invention when implementing the present invention.

The invention claimed is:

1. A mobile contents access, transmission and reception method using a hyperlink message, the method being performed through a contents provider server having at least communication means and control means, a mobile communication provider server having at least communication means, billing means and control means, and a terminal having at least communication means, display means, input means, storage means and control means, the method allowing predetermined contents to be displayed or activated when a hyperlink of the hyperlink message, transmitted from the contents provider server through the mobile communication provider server to the terminal, stored in the terminal and displayed on the terminal is selected, the hyperlink message being configured to include at least hyperlink information designating a connection point of contents to be activated on the terminal and free communication identification information indicating that a communication fee normally charged to the terminal by the mobile communication provider server for contents access is not charged the method comprising the steps of:

if it is determined that the free communication identification information is included in the hyperlink message the terminal displaying the hyperlink message with a predetermined indication of free communication on the display means;

if a connection to the connection point is requested from the terminal to the mobile communication provider server by selecting the hyperlink of the hyperlink message, the mobile communication provider server causing the connection to be established in response to the connection request;

the contents being activated in the terminal through the connection between the terminal and the connection point; and when the connection is terminated, the mobile communication provider server calculating a communication fee to be charged for the connection for data transmission and reception through the billing means, and storing it as billing information for the contents provider rather than billing information for the terminal;

wherein the hyperlink message further comprises exemption range identification information indicating an exemption range which is a limited range of exemption from the data communication fee to be charged to the terminal by the mobile communication provider server for the connection to the contents, further comprising the steps of:

the control means of the terminal accumulating parameters related to the exemption range set in the exemption range identification information during transmission and reception of the contents;

the control means of the terminal determining whether the accumulated parameters fall within the exemption range; and if the accumulated parameters exceed the exemption range, the control means of the terminal setting the connection between the terminal and the connection point as impossible.

2. The mobile contents access, transmission and reception method according to claim 1, wherein the hyperlink message further comprises exemption range identification information representing an exemption range which is a limited range of exemption from the communication fee to be charged to the terminal by the mobile communication provider server for the connection to the contents, further comprising the steps of:

the control means of the mobile communication provider server storing information about the terminal and a corresponding exemption range, list before transmitting the hyperlink message including the exemption range identification information to the terminal;

The control means of the mobile communication provider server determining whether the terminal is included in the list when the connection request is made by the terminal;

if the terminal is included in the list, the control means of the mobile communication provider server accumulating parameters related to the exemption range set in the exemption range identification information during the transmission and reception of the contents;

the control means of the mobile communication provider server determining whether the accumulated parameters falls within the exemption range; and if the accumulated parameters exceed the exemption range, the control means of the mobile communication provider server setting the connection between the terminal and the connection point as impossible.

3. The mobile contents access, transmission and reception method according to claim 1, wherein the hyperlink message further comprises exemption range identification information representing an exemption range which is a limited range of exemption from the communication fee to be charged to the terminal by the mobile communication provider server for the connection to the contents, further comprising the steps of:

at least one of the control means of the contents provider server and the control means of the connection point storing information about the terminal and a corresponding exemption range list before transmitting the hyperlink message including the exemption range identification information, to the terminal;

when the connection request is made by the terminal, at least one of the control means of the contents provider server and the control means of the connection point determining whether the terminal is included in the list;

if the terminal is included in the list, at least one of the control means of the contents provider server and the control means of the connection point accumulating parameters related to the exemption range set in the exemption range identification information during the transmission and reception of the contents;

at least one of the control means of the contents provider server and the control means of the connection point determining whether the accumulated parameters fall within the exemption range; and if the accumulated parameters exceed the exemption range, at least one of the control means of the contents provider server and the control means of the connection point setting the connection between the terminal and the connection point as impossible.

4. The mobile contents access, transmission and reception method according to claim 1, wherein the exemption range identification information is:

(1) at least one of a total packet size, a connection validity period, a number of connections, and a top folder of the connection point, with respect to the terminal;

(2) at least one of a total packet size, a connection validity period, a number of connections, and a top folder of the connection point with respect to the connection point; or (3) at least one of a total packet size, a connection validity period, a number of connections, and a top folder of the connection point with respect to the hyperlink message.

5. The mobile contents access, transmission and reception method according to claim 1, wherein:

the hyperlink message further comprises scheduled time identification information designating a time at which the hyperlink message is to be displayed on the display means; and if it is determined that the scheduled time identification information is included in the hyperlink message, the control means of the terminal displays the hyperlink message on the display means after the scheduled time has been reached.

6. The mobile contents access, transmission and reception method according to claim 5, wherein, when the connection is disconnected before responses to all of the inquiry items have been completely made, and, thereafter, the connection is reconnected, activation starts from an item next to an item to which a response has been made.

7. The mobile contents access, transmission and reception method according to claim 3, further comprising the steps of:

at least one of the control means of the contents provider server and the control means of the connection point adding predetermined information about target terminals, which are to be exempted from the communication fee for data transmission and reception by the contents provider server, to a vicarious payment beneficiary list;

at least one of the control means of the contents provider server and the control means of the connection point transmitting the vicarious payment beneficiary list to the mobile communication provider server along with the hyperlink message; and at least one of the control means of the contents provider server and the control means of the connection point performing setting about whether the terminal can be connected to the connection point after making a determination of whether the terminal requesting the connection is a terminal on the vicarious payment beneficiary list.

8. A terminal for mobile contents access, transmission and reception the terminal allowing predetermined contents to be displayed or activated when a hyperlink of a hyperlink message, which is transmitted from a contents provider server, having at least communication means and control means, through a mobile communication provider server, having at least communication means, billing means and control means, and is stored and displayed, is selected, the hyperlink message including at least hyperlink information designating a connection point of contents which will be activated on the terminal, and free communication identification information indicating that a data communication fee, normally to be charged to the terminal by the mobile communication provider server for the contents access, is not charged, the terminal comprising:

communication means for connecting to the mobile communication provider server;

display means for adding a predetermined indication of free communication to the hyperlink message and then displaying it;

input means;

storage means for storing the hyperlink message; and control means for directing the display means to add the predetermined indication of free communication to the hyperlink message and then displaying it if it is determined that the free communication identification information is included in the hyperlink message, and activating the contents on the display means while transmitting and receiving contents using the communication means through the mobile communication provider server after connecting to the connection point without being charged by the billing means of the mobile communication provider server, when a hyperlink of the hyperlink message to which the indication of free communication is added is selected wherein:

the hyperlink message further comprises exemption range identification information representing an exemption range which is a limited range of exemption from the data communication fee charged to the terminal by the mobile communication provider server for the connection to the contents; and the control means of the terminal accumulates parameters related to the exemption range set in the exemption range identification information during transmission and reception of the contents, and sets the connection between the terminal and the connection point as possible if the accumulated parameters fall within the exemption range.

9. The terminal for mobile contents access, transmission and reception according to claim 8, wherein the exemption range identification information is at least one of a total packet size, a connection validity period, a number of connections, and a top folder of the connection point, with respect to the terminal.

10. The terminal for mobile contents access, transmission and reception method according to claim 8, wherein:
the hyperlink message further comprises profit provision identification information indicating that a predetermined profit is provided to the terminal through at least one of the control means of the contents provider server and the control means of the connection point if a predetermined condition is satisfied through connection to the contents; and
the control means of the terminal adds a predetermined indication of profit provision to the hyperlink message and then displays it on the display means if it is determined that the profit provision identification information is included in the hyperlink message.

11. A contents provider server for mobile contents access, transmission and reception, the contents provider server allowing predetermined contents to be displayed or activated on a terminal when a hyperlink of the hyperlink message, which is transmitted to, stored in, and displayed on a terminal having at least communication means, display means, input means, storage means and control means, through a mobile communication provider server having at least communication means, billing means and control means, is selected, the hyperlink message including at least hyperlink information designating a connection point of the contents which will be activated on the terminal, and free communication identification information indicating that a communication fee normally charged to the terminal by the mobile communication provider server for the contents access is not to be charged, the contents provider server comprising:
communication means for connecting to the mobile communication provider server and transmitting the hyperlink message, and connecting to a connection point and transmitting contents to be stored; and
control means for establishing a connection between the terminal and the connection point through control over the communication means while being charged for the connection by the billing means of the mobile communication provider server when the hyperlink message, which has been determined to include the free communication identification information by the control means of the terminal, is selected and then the connection between the terminal and the connection point is requested by the mobile communication provider server wherein:
the hyperlink message further comprises exemption range identification information indicating an exemption range, which is a limited range of exemption from the data communication fee normally charged to the terminal by the mobile communication provider server for the connection to contents; and
at least one of the control means of the contents provider server and the control means of the connection point accumulates parameters related to the exemption range set in the exemption range identification information during transmission and reception of the contents, and sets the connection between the terminal and the connection point as possible if the accumulated parameters fall within the exemption range.

12. The contents provider server mobile contents access, transmission and reception according to claim 11, wherein the exemption range identification information is:
(1) at least one of a total packet size, a connection validity period, a number of connections, and a top folder of the connection point, with respect to the terminal;
(2) at least one of a total packet size, a connection validity period, a number of connections, and a top folder of the connection point, with respect to the connection point; or
(3) at least one of a total packet size, a connection validity period, a number of connections, and a top folder of the connection point, with respect to the hyperlink message.

13. The contents provider server for mobile contents access, transmission and reception according to claim 11, wherein:
the contents are contents for making responses to one or more inquiry items; and
when a response to each of the items is made, the response is stored in a field of a database on an Internet, which corresponds to the item.

* * * * *